(12) United States Patent
Szucs

(10) Patent No.: US 8,051,473 B2
(45) Date of Patent: Nov. 1, 2011

(54) METHOD FOR OPERATING NETWORKS OF DEVICES

(75) Inventor: Paul Szucs, Ostfildern (DE)

(73) Assignee: Sony Deutschland GmbH, Cologne (DE)

( * ) Notice: Subject to any disclaimer, the term of this patent is extended or adjusted under 35 U.S.C. 154(b) by 1463 days.

(21) Appl. No.: 11/183,593

(22) Filed: Jul. 18, 2005

(65) Prior Publication Data

US 2006/0015502 A1 Jan. 19, 2006

(30) Foreign Application Priority Data

Jul. 19, 2004 (EP) ..................... 04017020

(51) Int. Cl.
*G06F 7/04* (2006.01)
*H04L 29/06* (2006.01)
*H04N 7/16* (2011.01)
*G06F 15/16* (2006.01)

(52) U.S. Cl. ................ 726/10; 726/4; 726/28; 709/245

(58) Field of Classification Search .................. 709/245; 726/4, 28
See application file for complete search history.

(56) References Cited

U.S. PATENT DOCUMENTS

| 7,299,362 | B2 * | 11/2007 | Shen et al. .................... 713/189 |
| 7,325,058 | B1 * | 1/2008 | Sheth et al. .................... 709/225 |
| 7,676,846 | B2 * | 3/2010 | Robert et al. ................... 726/27 |
| 2002/0157002 | A1 * | 10/2002 | Messerges et al. ........... 713/155 |
| 2003/0018491 | A1 * | 1/2003 | Nakahara et al. ................. 705/1 |
| 2003/0076955 | A1 * | 4/2003 | Alve et al. ...................... 380/201 |
| 2005/0022227 | A1 * | 1/2005 | Shen et al. ....................... 725/28 |
| 2005/0071663 | A1 * | 3/2005 | Medvinsky et al. .......... 713/200 |
| 2005/0102513 | A1 * | 5/2005 | Alve .............................. 713/168 |
| 2006/0190621 | A1 * | 8/2006 | Kamperman et al. ........ 709/245 |

FOREIGN PATENT DOCUMENTS

| JP | 8-263570 | 10/1996 |
| JP | 2003-323343 | 11/2003 |
| WO | WO 03/009112 | 1/2003 |
| WO | WO 03/098931 A1 | 11/2003 |

OTHER PUBLICATIONS

J. Gildred: "Protected Entertainment Rights Management (PERM)" Internet-Draft, 'Online! Jun. 25, 2004, XP002312066.

(Continued)

*Primary Examiner* — William Korzuch
*Assistant Examiner* — Trang Doan
(74) *Attorney, Agent, or Firm* — Oblon, Spivak, McClelland, Maier & Neustadt, L.L.P.

(57) ABSTRACT

A method for operating networks of devices (d) wherein said networks are formed by a plurality of domains (D), wherein each of said domains (D) is formed by one or by a plurality of sub-networks (n) of devices (d), wherein each device (d) is assigned to at least one authorized domain (AD) of said domains (D) by assigning and/or carrying/storing in each case at least one type of authorized domain identifier (ADI) to/by said respective device (d), wherein each type of authorized domain identifier (ADI) is descriptive and/or characteristic for said authorized domain (AD) and its type as well as for a membership of said respective device (d) to said respective domain (D), and wherein an access to, the provision of, and/or a transmission of data with respect to audio/video content by each device (d) is in each case ruled on the basis of the respective assigned and/or carried/storied authorized domain identifiers (ADI).

39 Claims, 10 Drawing Sheets

OTHER PUBLICATIONS

"IBM Response to DVB-CPT Call for Proposals for Content Protection & Copy Management: XCP Cluster Protocol" IBM Response to DVB-CPT, Oct. 19, 2001, XP001148193.

Heuvel Van Den S A F A et al: "Secure Content Management in Authorised Domains" International Broadcasting Convention, XX, XX, Sep. 15, 2002, pp. 467-474, XP002273504.

J.P. Andreaux, A. Durand, T. Furon, E. Diehl: "Copy Protection System for Digital Home Networks" IEEE Signal Processing Magazine, Mar. 2004, pp. 100-108, XP002312067.

W. Jonker, J.P. Linnartz: "Digital Rights Management in Consumer Electronics Products" IEEE Signal Processing Magazine, Apr. 2004, pp. 82-91, XP002312068.

European Office Action issued on Jan. 21, 2011 in corresponding European Application No. 04 017 020.

Chris Hibbert et al., "A Copy Protection and Content Management System from the DVB", DVB-Scene Magazine, vol. 5, www.dvb.org/news_events/dvbscene_magazine/, Mar. 16, 2003, pp. 1-6.

Office Action issued Mar. 1, 2011, in Japanese Patent Application No. 2005-208662 (with partial English-language translation).

\* cited by examiner

METHOD FOR OPERATING NETWORKS OF DEVICES

The present invention relates to a method for operating networks of devices. The present invention more particular relates to a method for the administration and management of personal domains of devices e. g. for the purpose of audio-visual content protection and copy management for instance in the consumer environment.

Networks of devices and therefore the ways of operating such networks become more and more important. Several security aspects arise also in connection with respect to audio-visual content protection and copy management requirements when the network is divided into domains of devices and sub-networks.

Due to the threats of piracy and illegal sharing with audio-visual content in digital formats, content providers wish that the consumer environment into which such valuable content is released offers some assurance that these threats are addressed. A common scenario is that content is bound to a consumer's personal domain of devices, so that the content that user acquires is usable only in his domain, if required by the provider of that particular content. This invention inter alia provides a simple method of managing such domains of devices, combining technical means with compliance rules of domain management. It is in particular intended that the ideas presented here can form part of a complete DRM or Content Protection system.

It is therefore an object underlying the present invention to provide a method for operating a network of devices which is comparably easy, convenient to use, reliable, and which automatically offers content protection and copy management features.

The object is achieved by a method for operating a network of devices according to independent claim 1. Preferred embodiments of the inventive method are within the scope of the respective dependent sub-claims. The object is further achieved by a system or apparatus, by a device, by a computer program product, as well as by a computer readable storage medium and a storage medium.

According to the present invention a method for operating a network of devices is provided wherein said network is formed by a plurality of domains, wherein each of said domains is formed by one or by a plurality of sub-networks of devices, wherein each device is assigned to at least one authorized domain of said domains by assigning and/or carrying/storing in each case at least one type of authorized domain identifier to/by said respective device, wherein each type of authorized domain identifier is descriptive and/or characteristic for said authorized domain and its type as well as for a membership of said respective device to said respective domain, and wherein an access to, the provision of, and/or a transmission of data with respect to audio/video content by each device is in each case ruled on the basis of the respective assigned and/or carried/storied authorized domain identifiers.

It is therefore a basic aspect of the present invention to assign to each device and therefore to sub-networks and domains at least one type of authorized domain identifier which is descriptive and/or characteristic for said device and said authorized domain to which it belongs and its type as well as for a membership of said respective device to said respective domain. By means of said authorized domain identifiers the access to, the provision of, and/or a transmission of data with respect to audio/video content by each device can be automatically ruled in particular in order to fulfill audio-visual content protection and copy management requirements.

Preferably, one authorized domain identifier ADI or an arbitrary plurality of authorized domain identifiers ADI of the group of authorized domain identifiers ADI is used which consists of primary authorized domain identifiers PADI, secondary authorized domain identifiers SADI, and merged authorized domain identifiers MADI.

It is further preferred that wherein one single primary authorized domain identifier is used as an authorized domain identifier; i. e. each device is at most assigned to one single primary authorized domain as a primary member.

Further preferably, one secondary authorized domain identifier and/or one merged authorized domain identifier are used as—in particular additional—authorized domain identifiers.

In this case, a primary authorized domain identifier may be set and used in a respective device in order to identify, as a primary authorized domain, a domain of said network to which said respective device having assigned and/or carrying/storing the respective primary authorized domain identifier belongs, is present, is functioning, and/or is assigned to as a primary member thereof, in particular in order to have access to protected content which is associated with or bound to said primary authorized domain.

Additionally or alternatively, a secondary authorized domain identifier is set and used in a respective device in order to identify as a secondary authorized domain a domain of said network to which said respective device having assigned and/or carrying/storing the respective secondary authorized domain identifier belongs, is present, as functioning, and/or is assigned to temporarily or as a secondary member thereof, in particular in order to have access to protected content which is associated with or bound to said secondary authorized domain.

Further additionally or alternatively, a merged authorized domain identifier is set and used in a respective device of another domain in order to identify as a merged authorized domain, a first domain of said network or a combination of first domains of said network to which said respective device having assigned and/or carrying/storing the respective merged authorized domain identifier as a new merged member of said first domain, in particular in order to have access to protected content which is associated with or bound to said merged authorized domain.

It is further of advantage if additionally or alternatively a primary authorized domain identifier of a respective device is changed if and only if the respective device changes its membership to be a primary member of another primary authorized domain identifier or to be a merged member of another primary authorized domain identifier.

A process of partly or completely merging to a first authorized domain as a primary authorized domain a second authorized domain as a merged authorized domain may comprise a step of assigning and/or carrying the respective primary authorized domain identifier of the first authorized domain as a merged authorized domain identifier of the merged devices of the second authorized domain or the part thereof to be merged.

A process of partly or completely merging to a first authorized domain as a primary authorized domain a second authorized domain as a merged authorized domain may comprise a step of enabling access to the content associated with or bounded by the second authorized domain or the merged devices thereof by the first authorized domain or by the respective devices thereof.

For each second device of a second authorized domain as a secondary authorized domain with respect to a first authorized domain as a primary authorized domain a content associated with and/or bound to first devices of said first authorized domain as said primary authorized domain and/or to third devices of a third authorized domain as a merged authorized domain with respect to said first authorized domain as said primary authorized domain may be made temporarily accessible.

For each first device of a first authorized domain as a primary authorized domain the content associated with and/or bound to each second device of a second authorized domain as a secondary authorized domain with respect to said first authorized domain as said primary authorized domain may be made temporarily accessible, in particular as long as the respective second device is connected or merged to said first authorized domain as said primary authorized domain and/or in particular with respect to content which is locally stored/bound to the respective second device.

Content associated with and/or bound to a second device of a primary authorized domain, a secondary authorized domain, and/or a merged authorized domain may be made accessible to any first device connected to said primary authorized domain, secondary authorized domain, and/or merged authorized domain.

Content which is newly created by a device of a primary authorized domain, secondary authorized domain, and/or merged authorized domain may be associated with and/or bound to the underlying primary authorized domain and the respective primary authorized domain identifier.

Devices of the network and in particular of the domains of the network may be classified as being either authorized domain servers or AD servers or as being authorized domain clients or AD clients and/or as having either server capabilities and functionalities or as having client capabilities and functionalities.

Each AD server may be—in particular in an active mode—enabled to have one or an arbitrary plurality of capabilities/functionalities of the group of capabilities/functionalities which consists of initiating new authorized domains (AD), granting the right of membership with respect to an underlying primary authorized domain, to a given other device (d), and managing the process of terminating a given membership of a given device (d) to an underlying primary authorized domain.

Each device which is capable of ingesting content into an underlying primary authorized domain may be enabled to have capabilities and/or functionalities of an AD server.

A plurality of AD servers may be operated in one given primary authorized domain.

AD servers and/or AD clients may be enabled to become secondary members of another primary authorized domain.

An authorized domain management protocol or an AD mangement protocol may be realized and used, which in particular may consist of one or an arbitrary plurality of items of the group of items which consists of:

local network broadcast notification of device's Primary AD membership, or of Primary, Secondary and Merged AD membership, and whether it is acting as an AD Server,
specific enquiry to a device to ascertain its AD membership status (Primary, Secondary and Merged ADI's, AD Name, Server or Client for PAD),
specific response to the above enquiry containing the requested information for the enquired device,
local network broadcast enquiry of device's need to interact with the AD Server in the given PAD,
specific response to the above enquiry notifying of the presence and identification of an AD Server for the given PADI,
specific command to a device to set its Primary, Secondary, or Merged ADI, AD Name to the given value(s),
specific response to the above command indicating whether the command could be carried out or not,
specific request to an AD Server for a device (which is already a Secondary Member of the AD) to merge to the Primary AD,
specific request to an AD Server for a device to leave the Primary AD,
specific responses to each of the preceding three requests indicating whether the request could be carried out or not.

Additionally or alternatively, a plurality of AD servers may be employed in at least one primary authorized domain and an authorized domain server protocol or AD server protocol may be realized and used which in particular may consist of one or an arbitrary plurality of items of the group of items which consists of:

specific enquiry to another AD Server to ascertain the AD Server status of the PAD,
specific response to the above command providing a list of AD Server devices ID's and the current value of ADMC,
specific request to another AD Server to increment ADMC, decrement ADMC, or set ADMC to the given value,
specific notification to another AD Server that the device will disable its AD Server function, thus is to be removed from the list of Primary AD Servers.

Protected content may be bound to or associated with a given particular primary authorized domain and/or to the respective member devices thereof. In particular the respective content protection may be defined by a respective usage state information.

All member devices of a given primary authorized domain may be allowed and/or ma be enabled to have access to content within the bounds of the content's usage state information.

Temporary or secondary member devices of a given primary authorized domain may be allowed and/or are enabled to have access to content associated with and/or bound to said given primary authorized domain and/or to a given merged authorized domain if and only if said temporary or secondary member devices (d) are physically located in the same local environment as said given primary authorized domain.

Primary member devices of a given authorized domain may be allowed and/or may be enabled to have access to content bound to the secondary member's primary authorized domain if and only if the device carrying such content is physically located in the same local environment as said primary authorized domain.

Continued presence of primary and/or secondary members devices may be verified prior each process of content exchange, in particular in all cases where the respective content item is bound to the respective secondary authorized domain and/or to the respective secondary authorized domain identifier.

There may be defined a finite maximum number of devices—being it AD servers or AD clients—that can be member devices of one primary authorized domain.

A compliant device may be enabled to become a member device—whether primary or secondary—of an authorized domain only after the registration procedure or process has been started or carried out, in particular explicitly initiated by a user and/or in particular only upon the specific affirmative action of the user.

Primary authorized domain device membership transitions may be enabled or may be made possible if and only if the physical vicinity to the AD Server(s) can be verified, in particular if the respective device is connected to the network or sub-network, in particular to a LAN.

It is of advantage if only an AD virgin device can directly join an existing primary authorized domain.

Preferably, an AD virgin device can establish a new primary authorized domain.

Additionally or alternatively, a device which is a primary member of one primary authorized domain may only become a secondary member of another and different primary authorized domain.

Only a device which is a secondary member of a primary authorized domain may become merged to said primary authorized domain.

A storage medium may be used in order to prepare an AD virgin device to be used in a method according to any one of the preceding claims and in particular in order to become a primary member of a given primary authorized domain.

A respective primary authorized domain identifier may be transferred to said respective AD virgin device by using said storage medium.

According to a further preferred embodiment of the inventive method said storage medium may be prepared—in particular within a given primary authorized domain—in order to carry a respective primary authorized domain identifier of an or of said given primary authorized domain, wherein said storage medium may be then transferred to said AD virgin device in particular by removing it from said given primary authorized domain, and wherein said storage medium may then be read by said AD virgin device in order to carry said respective primary authorized domain identifier of said given primary authorized domain and in order to become a primary member of said given primary authorized domain.

A device which leaves a primary authorized domain may be effectively put into the AD virgin state.

At least one AD server may be provided and may be operational in a primary authorized domain.

Primary AD device membership transitions may be enabled and/or ay be made possible if only if all active primary AD servers are present and operational in the local environment.

Once an AD server functionality has been disabled in a device it is preferably never enabled again to be re-enabled for the same primary authorized domain or the same primary authorized domain identifier.

According to a further aspect of the present invention a system or an apparatus are provided which are adapted and arranged and which comprises means in order to realize the method for operating networks of devices.

According to a preferred embodiment the inventive system or apparatus comprises means for obtaining and/or generating a primary authorized domain identifier for a respective primary authorized domain, means for storing a primary authorized domain identifier for a respective primary authorized domain within respective primary authorized domain, means for obtaining an authorized domain identifier, in particular a primary authorized domain identifier, a secondary authorized domain identifier, and/or a merged authorized domain identifier from and for a respective authorized domain device, and means for comparing said primary authorized domain identifier for said respective primary authorized domain with said authorized domain identifier of said device.

Additionally, according to a further aspect of the present invention a device for a network is provided which is adapted and arranged and which comprises means in order to realize or to be used in the inventive method for operating networks of devices.

Preferably, said device comprises means for obtaining and/or generating at least one authorized domain identifier, in particular a primary authorized domain identifier, a secondary authorized domain identifier, and/or a merged authorized domain identifier with respect to a given authorized domain, and at least one means for storing said at least one authorized domain identifier, in particular said primary authorized domain identifier, said secondary authorized domain identifier, and/or said merged authorized domain identifier.

According to a further aspect of the present invention a computer program product is provided comprising computer means which is adapted to realize the method for operating a network of devices according to the present invention and/or the system according to the present invention when it is executed on a computer or a digital signal processing means.

According to a further aspect of the present invention a computer readable storage medium is provided comprising a computer program product according to the present invention.

According to a further aspect of the present invention a storage medium is provided which is adapted and arranged in order enable a AD virgin device in order to be used in the inventive method and in particular in order to become a primary member of a given primary authorized domain.

According to a preferred embodiment the inventive storage medium carries or has stored therein a respective primary authorized domain identifier (PADI) of a respective primary authorized domain (PAD) and is adapted and arranged in order to be read by an AD virgin device (d).

In the following these and further aspects of the present invention will be further discussed by taking reference to the accompanying figures based on preferred embodiments of the present invention.

Figure 9A:
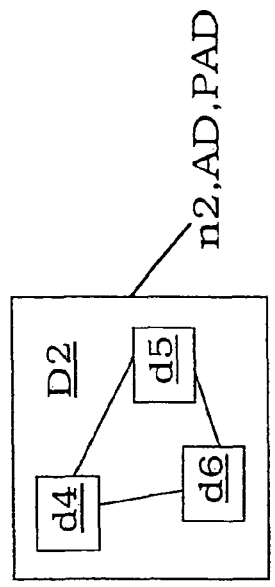
Figure 9B:
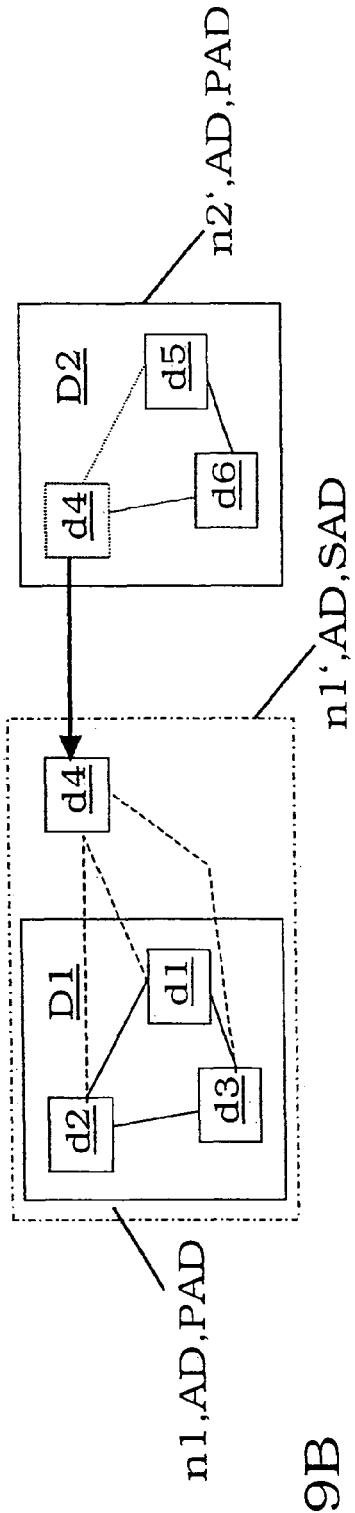
Figure 9C:
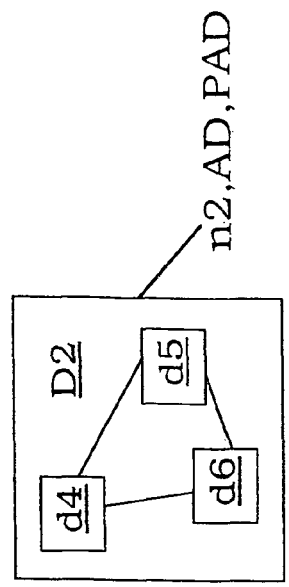

FIG. 9A-C are schematical block diagrams which depict some basic structures of an embodiment of the present invention.

Figure 10A:
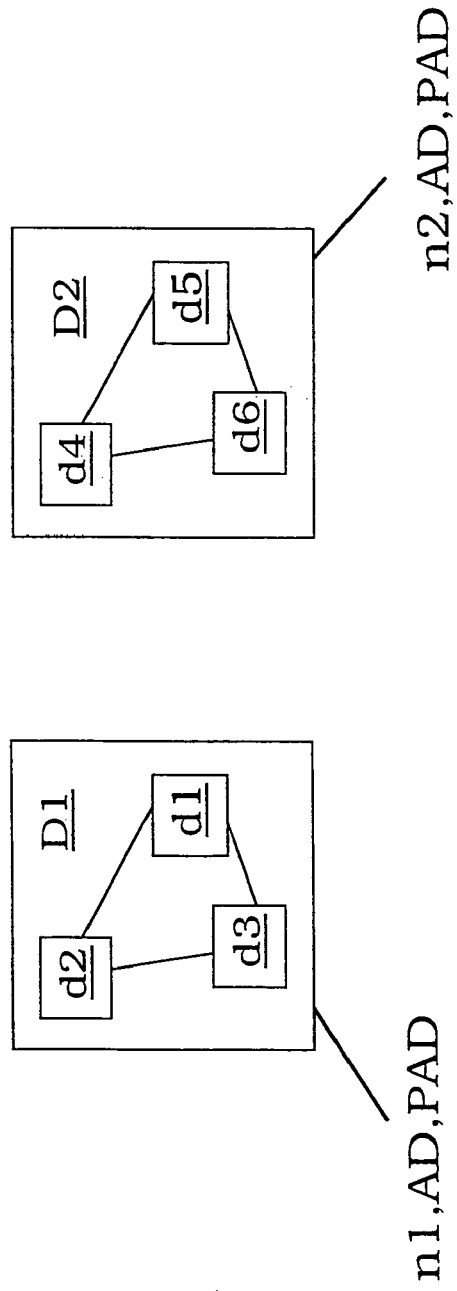

FIG. 10A, B are schematical block diagrams which depict some basic structures of another embodiment of the present invention.

First of all, FIGS. 9A-C and 10A, B are described in order to better introduce some of the invention's concepts and the respective notions and nomenclature.

FIGS. 9A-C and 10A, B are schematical block diagrams which depict some basic structures of two embodiments of the present invention.

Underlying the structures shown in FIGS. 9A-C and 10A, B are arrangements of two networks n1 and n2 as first and second primary authorized domains PAD which are denoted by D1 and D2, which are physically and logically separated in the initial states shown in FIGS. 9A and 10A, and which comprise devices d1 to d3 and d4 to d6, respectively.

In the state shown in FIG. 9B device d4 of the second network n2 is disconnected from its PAD D2 an moved to said first network n1 in order to be connected to said first PAD D1 and in order to become an temporary or secondary member of said first PAD D1. Here, the register for the secondary authorized domain identifier SADI of device d4 contains the primary authorized domain identifier PADI of D1 and a temporary first physical network n1' is formed as a secondary authorized domain SAD by D1 and d4.

In the state shown in FIG. 9C device d4 of the second network n2 is disconnected from the first network n1 and the temporary membership of d4 to D1 is terminated. D4 has returned to D2 as a primary member thereof.

Figure 10B:
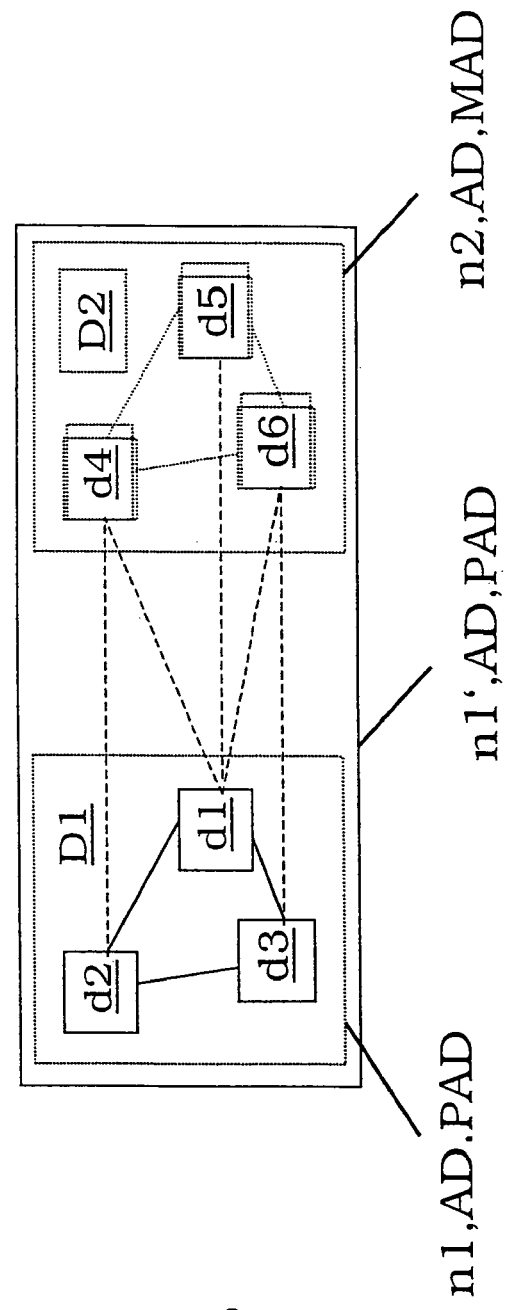

Starting from the initial state shown in FIG. 10A the devices d4 to d6 of D2 remain physically connected but also establish physical connection to devices d1 to d3 of the first network n1 and its primary authorized domain D1. Therefore, a devices d4 to d6 merge into D1 and a merged authorized domain MAD is formed, as shown in FIG. 10B.

The invention relates—inter alia—to a method for the administration and management of personal domains of devices e. g. for the purpose of audio-visual content protection and copy management for instance in the consumer environment.

Relation to Prior Art

The basic concept of the consumer's authorized domain (AD) is already largely established in the prior art.

The most advanced and relevant known prior art is given by [4] and [5].

IBM's xCP Cluster Protocol [4], which provides technical methods for establishing secure device clusters (equivalent of Authorized Domains) of compliant devices for the purpose of the managed usage of protected content, and the method of binding content to a particular AD by means of cluster-specific blocks of media encryption keys.

xCP, like any solution which relies on the binding of content by means of AD-specific encryption key(s), imposes the necessity to perform some kind of transformation content item encryption keys in the case when a new device is added to the cluster (domain). The present invention does not require this, but could be compatible with such an approach.

PERM [5] includes the concept of "zones" for allowed content distribution. A PERM Zone corresponds to the Authorized Domain. The PERM architecture seems to imply unnecessarily restrictive compliance rules, for example that Zone Management becomes complicated when more than one Content Source Device (CsoD) is present in the Zone. It is entirely to be expected that protected content may enter the AD, or Zone from various acquisition sources; the PERM architecture seems to be tied too closely to a single acquisition point for content managing the whole Zone, or AD. The present invention has no such implied restrictiveness.

While PERM even includes the possibility of merging two Zones, it is restrictive in that the Zone Manager (ZM) device can not change its Zone membership. The present invention foresees the ability to render any compliant device to its AD-Virgin state, so that it can always join another AD.

PERM also does not allow the temporary access to protected content by visiting devices belonging to other Zones, or ADs.

In the present invention, the actual method of content encryption and binding to, or association with the domain is out of the scope of. It could be with individual item keys, or some AD key mechanism. Both methods are documented in the prior art.

The main disadvantage of the prior art is the lack of capability to support some common content usage scenarios that consumers will expect, for example the temporary visit of a friend with one of his devices containing content bound to his domain, to view on the host domain's devices.

The present invention thus provides a rational solution for the identification, and management of personal domains of audio-visual devices for the purpose of content protection and copy management.

As mentioned above, the invention inter alia relates to a method for the administration and management of personal domains of devices e. g. for the purpose of audio-visual content protection and copy management for instance in the consumer environment.

Introduction

The invention provides a method for the identification and secure management of groups of devices, both directly connected via a network, and remotely operating and mobile devices, belonging to a single household. Such a method is needed within a system for Audio-Visual Content Protection and Copy Management (CPCM) in the consumer environment so that content owned by a particular consumer or household can be identified as belonging to that consumer's domain of devices, in order to prevent the undesired sharing of commercial audio-visual content among different households of consumers. At the same time, commonly expected and reasonable content usage scenarios like the temporary sharing of content during a physical visit, must be supported.

The consumer or user of AV devices generally can own devices connected together in a home network. He may also own a second domicile where additional AV devices are located. The AV devices in his car are also part of the user's AD.

One additional common scenario is that a friend or relative of the user might visit, bringing along his own device and stored content to view together, even though this content might be bound or associated with the visitor's AD. The present invention enables such user-friendly scenarios without compromising the rights granted by the content provider restricting the usage of the content to a single AD.

Figure 1:
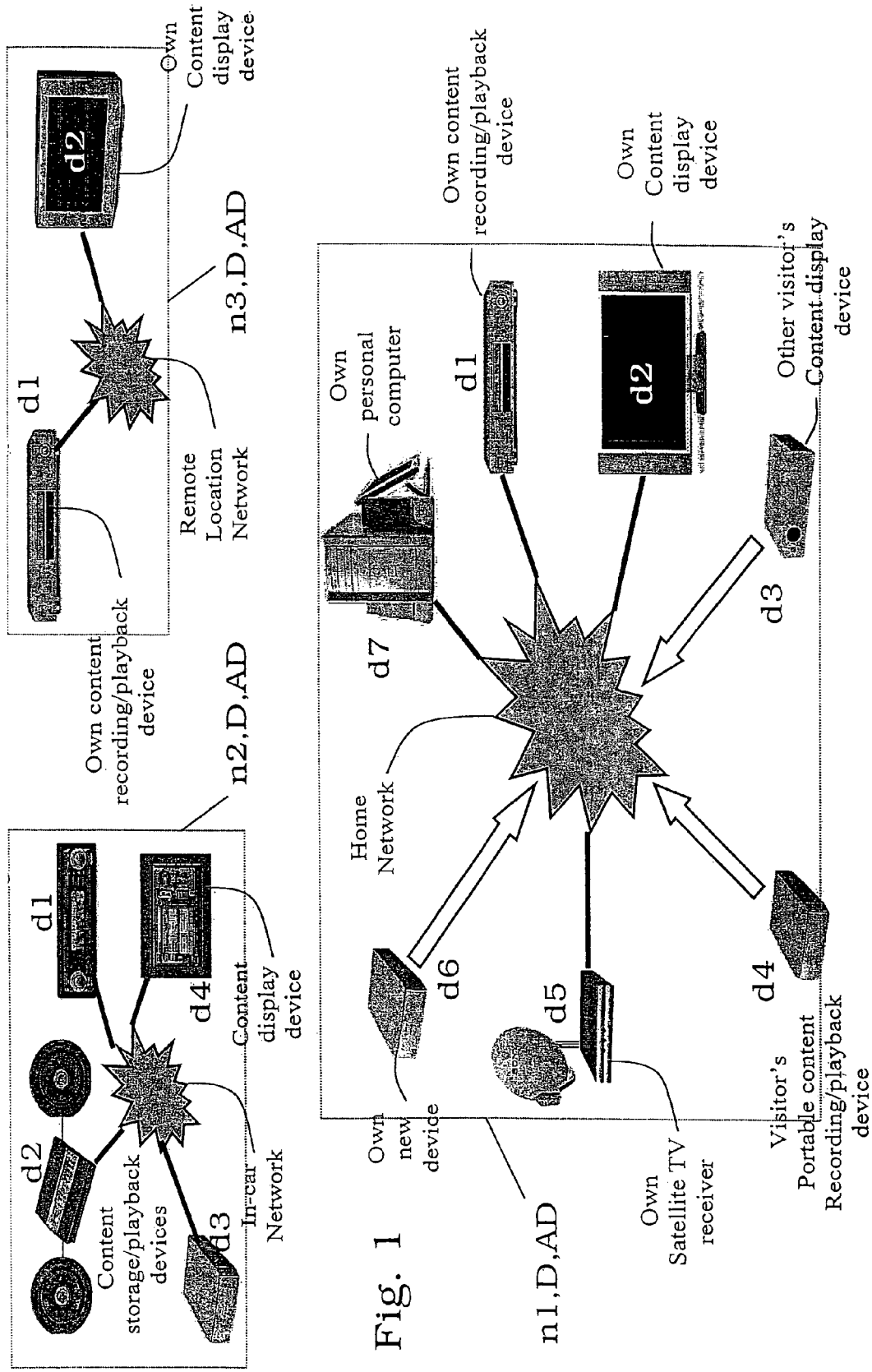
FIG. 1 is a schematical block diagram which depicts audio-visual device usage scenarios which might take place according to an embodiment of the present invention.

FIG. 1 depicts common AV device usage scenarios. The "user", generally meaning one household, has a network of AV devices installed in his main residence, plus a network of AV devices in his car, plus a network of AV devices at a remote location (for example in the user's holiday home). Devices brought by visitors to the main residence are shown as an example.

The method to enable such AD management is described in the present invention, and consists of technical measures and a set of rules for compliant device behavior. In broad terms, the new concepts introduced are:

- The different classes of AD membership that each compliant device has—Primary, Secondary, Merged, and the associated rules concerning device behavior with respect to each type of AD membership.
- The method by which a new Primary AD is established.
- The concept of AD Server and AD Client classes of compliant devices and the associated rules concerning device behavior with respect to adding and removing devices from the Primary AD; the modes of operation of AD Servers.
- The method of allowing the remote registration of AD Client member devices by proxy carried on a mobile device or a physical storage medium between the main and remote locations.

Each of these aspects of the invention can be used on its own or in combination with one, or more, or all of the other aspects, as part of an overall CPCM System.

Definitions

Device Identifiers and Names

Device identifiers and names are not required in order to implement the present invention, but they would certainly be useful in the interests of user-friendliness.

AD Identifier and Name

Authorized Domain Identifier (ADI)—an arbitrary pseudo-random number which is automatically generated in the AD initiation process. This could be 32 bits in length, with the value zero reserved to mean "no AD membership". ADIs are to be securely stored in compliant devices. Their settings must not be able to be manipulated by users.

Authorized Domain Name (ADN)—a human-readable text of arbitrary length, but which preferably has a fixed maximum length, for example 30 characters, for the user to be able to identify and manage his AD without needing to work with its ADI value. The ADN can be set when an AD is established. It is preferably stored in every device which has the ability to display or manipulate this text. The user should always be allowed to modify the ADN at will.

Primary, Secondary, and Merged AD

In order to allow various legitimate content usage scenarios to freely occur in the overall CPCM system, every compliant device is able to store three ADIs. These ADIs are preferably referred to as the Primary ADI (PADI), Secondary ADI (SADI), and Merged ADI (MADI). The PADI, SADI and MADI are to be implemented securely so that manipulation by the user is not possible. The PADI, by definition, identifies the Primary AD to which the devices belong, but content associated or bound to any of the three ADIs will be accessible in that Primary AD.

The PADI identifies the AD to which the device is generally present and functioning, i.e. The "home" environment or AD. The device's PADI will only change when the device changes owner, or during the legitimate process of merging two ADs. When such a merge takes place, all the devices in the new AD store the merged PADI as the MADI. Content associated or bound to MADI is thus accessible in the original PADI.

The SADI is more transient in nature. It is used to signify temporary membership of another AD, to allow certain content usage scenarios described later. When a device becomes a temporary, or Secondary Member of another AD, content associated or bound to both the Primary ADI and Merged ADI (if set) will become temporarily accessible to the Secondary AD devices. Conversely, content associated with or bound to the Secondary AD will be accessible from the Primary AD, but only as long as the visiting device is connected in the local network of the Primary AD, and only for the content stored locally on that visiting device. When the visiting device is disconnected from the Primary AD, then the mutual Secondary AD memberships are automatically revoked. This prevents legitimate copies of content associated with or bound to the Secondary AD being left in the Primary AD and still being accessible within the Primary AD after the visiting device is removed. This would be undesired content management behavior.

Thus a compliant device has access to content which is associated with or bound to any of the three ADs stored as the Primary, Merged or Secondary ADI. Newly created content instances by that devices are always associated with or bound to the PADI.

The MADI is used to allow one additional secondary ADI to be stored in another PAD, allowing that PAD to retain access to content bound to or associated with the MADI. It is needed for the legitimate case when two users form one household, so wish to merge their previously separate ADs and content into one AD. Compliant products will of course be able to transfer content bindings or associations to the new PAD, but it is conceivable that some legitimately acquired content instances will have been stored on write-once media and it may thus not be possible to transfer the AD binding. Using the MADI setting, the new PAD will retain access to such content.

AD Servers and AD Clients

According to the invention there are two classes of device: AD Server and AD Client.

An AD Server is a device which has the following functionality:
- It is able to initiate a new AD. (Thus only AD Servers need to be able to generate a random ADI value for the new AD).
- It is able to grant another compliant device the right to join the Primary AD.
- It manages the process of when a device leaves the PAD (i.e. maintains PAD integrity when this process occurs).

In the interest of user-friendliness and practicality, any compliant device which is able to ingest protected content into the Primary AD to which it belongs (i.e. associate or bind content items to that AD) must be equipped with AD Server functionality. This is due to the possibility that the device will at first operate as the lone member of an AD, and/or may need to admit AD Client devices to the AD (AD Client devices like pure displays, which can not ingest or bind content to an AD, so thus do not contain the AD Server functionality).

More than one AD Server could be operational in the AD, but they must be operating in the same local environment, or LAN. Normally one compliant device which is always active and running, would act as the AD Server for an AD.

Multiple AD Servers in a Primary AD obey compliance rules in order to ensure that the AD can not grow indefinitely. When a new device is admitted to the AD, all previously active AD Servers in that PAD must be operational in the local environment.

Both AD Servers and AD Clients can become Secondary Members of other Primary ADs. AD Client devices can also perform this transaction amongst themselves, without the involvement of an AD Server.

According to the invention mains-powered (i.e. generally stationary) devices can be AD Servers or AD Clients. Battery-powered devices are allowed to be only AD clients.

AD Server Operation Modes

There are three modes of operation of an AD Server—Active, Disabled, Remote.

Active Mode

The previous sub-section described the normal, or Active, mode of an AD Server.

Disabled Mode

It should also be possible to affect the disablement of the AD Server functionality on a device by user action, putting it into Disabled Mode. In this case the device reverts to be an AD Client. This would be carried out by the user if a device containing the AD Server function would not be present or operating continuously at the main PAD location, thus causing inconvenience when devices join or leave the PAD.

The AD Server disablement function should not be made available to the user if that device is the only AD Server operating in the PAD. AD Server disablement in this case would mean that the PAD would be permanently restricted to the current member devices.

The so-called Remote Mode is an optional mode for an implementation. If available on the device implementation, it should be accessible as for the Disable function. The user is always able to access content bound to his PAD at the remote location just by transferring AD Client devices from his main PAD location to the remote location. Remote Mode is however necessary if the user wishes to install additional complaint device(s) or a network thereof at a remote location, without those devices needing to be physically present at the main PAD location in order to become members of the PAD.

Remote Mode

An AD Server operating in Remote Mode is not able to manage PAD membership independently, rather only via proxy transactions stored on portable devices or storage media which are transferred between the Remote AD Server and an active AD Server at the main PAD location, and processed according to the following rules.

Each generated proxy transaction is valid for exactly one PAD membership transition.

In order to allow a device to join the PAD at the remote location, the user must first select to let a, or the, active AD Server at the main PAD location generate such a specific proxy. Thus the integrity of AD management is maintained at the main location in advance. The user transports the proxy (device or medium) to the remote location, where the AD Server in Remote Mode then processes this proxy at the remote location and allows the device to become a member of the PAD.

Conversely, if a device at the remote location is to leave the AD, then the AD Server at the remote location will generate such a remote proxy transaction (stored inside a portable device belonging to the user, which could also be a member of the AD, or stored on any kind of storage medium for which both the main and remote AD Servers are prepared to process) in order to register the device leaving with the active AD Server(s) at the main PAD location.

AD Device Membership Count (ADMC)

This is a variable number that is securely stored in each AD Server in a PAD. It states the current number of devices (AD Servers and Clients) registered in the Primary AD, both local (at the main PAD location) and remote devices.

AD Management Protocol

How AD membership and status is managed within any device and is presented to the user is out of the scope of the protocol, but some standardized mechanism is needed in order to securely acquire the information from other devices in the home network, and to securely actuate changes in other devices in the home network.

The AD Management Protocol consists of a non-secure part and a part which shall be implemented securely. The informational broadcast notifications, requests and their responses might not be implemented securely, for efficiency in network communications. But when an AD Protocol transaction is to be carried out which affects changes with respect to AD settings in any device, then a Secure Authenticated Channel (SAC) is to be set up between the affected devices. This is necessary first in order to securely verify the information obtained previously with the possibly insecure broadcast messages, then secondly in order to affect the AD settings changes securely.

The method of ensuring the security of the transactions that require this is outside the scope of the present invention. There are many methods in the prior art, for example using device mutual authentication via certificates, then establishing a secure authenticated channel between the devices, and encrypting the AD Management Protocol messages between the devices.

The AD Management Protocol enables flexible implementation of the invention at hand, taking into account the wide variety of AV devices which will be available on the market. For example, small devices with only very simple means of user interaction will be controlled largely by more powerful stationary devices, with respect to its AD membership.

The AD Management Protocol consists of the following elements:

Local network broadcast notification of device's Primary AD membership, or of Primary, Secondary and Merged AD membership, and whether it is acting as an AD Server.

Specific enquiry to a device to ascertain its AD membership status (Primary, Secondary and Merged ADI's, AD Name, Server or Client for PAD).

Specific response to the above enquiry containing the requested information for the enquired device.

Local network broadcast enquiry of device's need to interact with the AD Server in the given PAD.

Specific response to the above enquiry notifying of the presence and identification of an AD Server for the given PADI.

Specific command to a device to set its Primary, Secondary, or Merged ADI, AD Name to the given value(s).

Specific response to the above command indicating whether the command could be carried out or not.

Specific request to an AD Server for a device (which is already a Secondary Member of the AD) to merge to the Primary AD.

Specific request to an AD Server for a device to leave the Primary AD.

Specific responses to each of the preceding three requests indicating whether the request could be carried out or not.

Within the realms of a complete CPCM system, complaint devices are required to notify other devices in the local network about their AD membership status whenever a network reconfiguration event has taken place. What constitutes a network reconfiguration depend on the network technology deployed. It could be for example when a new device is connected to the network, when one or more devices are switched on and become addressable in the network, or when a device is disconnected from the networked or switched off.

A subsequent periodic notification might also be stipulated in such a CPCM system.

This broadcast notification preferably includes a timestamp indicating when the indicated AD settings were affected. This enables synchronization of member devices that were temporarily disconnected or powered off when a change occurred. A special set of operations is defined for the case when more than one AD Server is operational in a PAD. This is referred to as the AD Server Protocol.

The AD Server Protocol consists of the following elements:

Specific enquiry to another AD Server to ascertain the AD Server status of the PAD.

Specific response to the above command providing a list of AD Server devices ID's and the current value of ADMC.

Specific request to another AD Server to increment ADMC, decrement ADMC, or set ADMC to the given value.

Specific notification to another AD Server that the device will disable its AD Server function, thus is to be removed from the list of Primary AD Servers.

For the case that it is recognized that a device hosting an AD Server is present but currently in standby mode, then some function provided by the underlying home network control protocol would be used to wake up that device, in order to perform an AD Server operation.

AD Servers preferably store the identity or identities of other devices in the PAD acting as AD Server(s). This would aid user-friendliness in the case when one of the active AD Servers is temporarily not operational, for example due to temporary disconnection or being powered off.

All AD Server Protocol messages must be implemented securely in a SAC between all active AD Server devices.

AD Management Compliance Rules

This section lays down the necessary Compliance Rules for the method of AD Management which enable the required level of content management security, while at the same time allow all commonly expected user-friendly content, usage scenarios.

Actual Compliance Rules are shown in bold type. Some explanatory text accompanies each rule.

Access to Content Bound to or Associated with an AD

Within the underlying CPCM system, protected content may be bound, or associated with, a particular (Primary) AD.

All member devices of the PAD have access to such content within the bounds of the content USI.

Secondary (temporary) Member devices of the PAD have access to content bound to the PAD (and MAD) only when the Secondary Members are physically located in the same local environment as the PAD.

Conversely, Primary Members of an AD are allowed access to content bound to the Secondary Member's PAD only when the device carrying such content is physically located in the same local environment as the PAD.

The continued presence of Primary and Secondary Members is to be verified prior to every content exchange, where that content item is bound to the SADI.

Device Count in a PAD

There shall be a finite maximum number of devices (AD Servers plus AD Clients) that can be Members of one Primary AD.

This maximum number is preferably set to a value that would not unnecessarily restrict legitimate content usage. It could be set to for example 255 as a preferred embodiment.

When this number of registrations is reached, no further devices can join the AD. All AD Servers in a PAD must securely store ADMC, the number of devices which are currently a member of the PAD. If the PAD contains more than one AD Server, then the number will by definition always be the same on all AD Servers in the PAD.

This rule prevents the uncontrolled growth of a pseudo-AD for the purpose of illegally sharing content.

Establishing AD Membership of a Device

A compliant Device is able to become a Member, whether Primary or Secondary, of an AD only after the registration procedure has been started explicitly by the user, and only upon the specific affirmative action of the user.

This rule prohibits devices which automatically change their AD membership in order to temporarily join another AD for the purpose of gaining access to content bound to that AD.

This rule also avoids the inconvenience of foreign devices automatically being invited to join the AD due to their circumstantial ad-hoc presence and visibility in the vicinity of the AD.

Positive affirmation of the domain join also ensures that the user can be sure to that his new device is joining his own domain, and not his neighbor's domain, which might happen to be visible via wireless network, for example.

Primary AD device membership transitions are possible only when the physical vicinity to the AD Server(s) can be verified (device is connected to the LAN).

An additional mechanism for the admission of devices to the PAD is defined by transferring a physical storage medium carrying AD registration information in order to allow other remote devices to join the AD by proxy.

AD Membership State Transitions

Only an AD-Virgin device can directly join an existing PAD.

Only an AD-Virgin device can establish a new PAD.

A device which is a Primary Member of one PAD can only become a Secondary Member of another PAD.

Only a device which is a Secondary Member of a PAD can become Merged to that PAD.

A device which leaves a PAD is effectively put into the AD-Virgin state.

Figure 2:
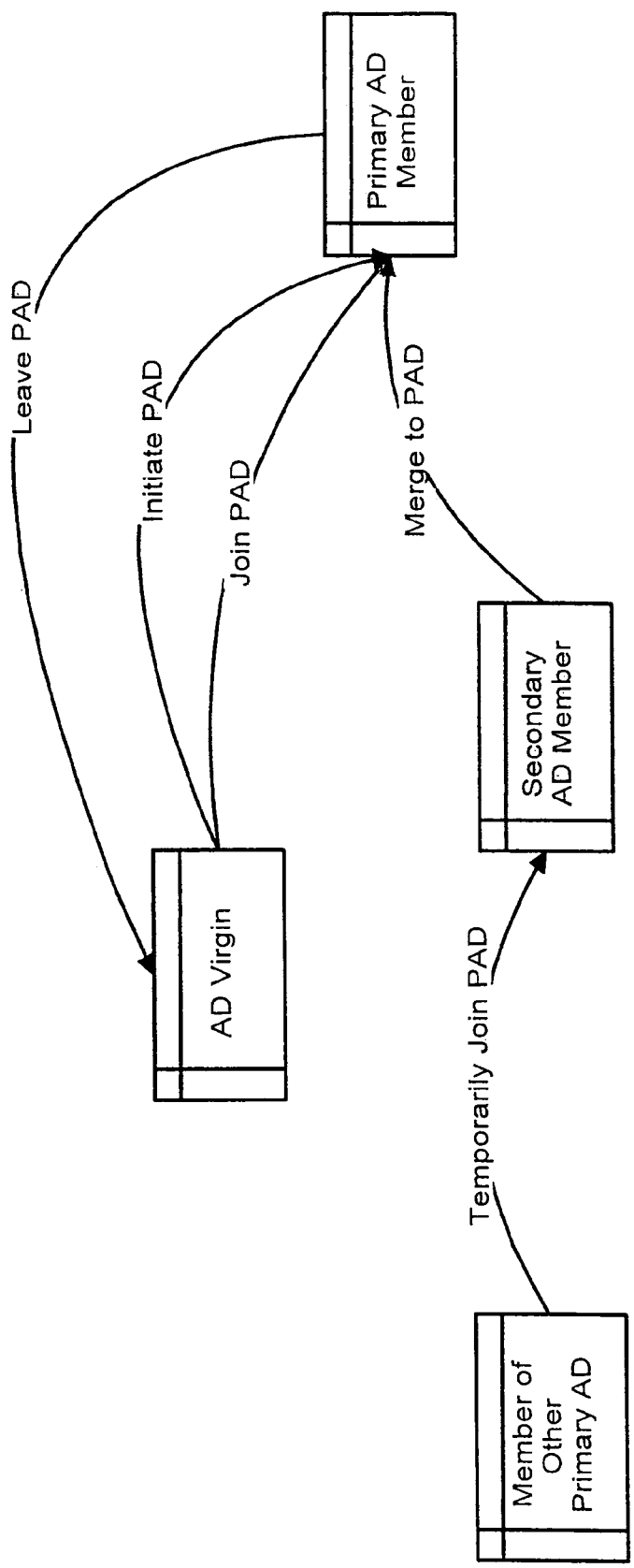
FIG. 2 is a schematical block diagram which shows some allowed AD membership state transitions with the corresponding terminology in the AD management protocol according to an embodiment of the present invention.

FIG. 2 shows the allowed AD membership state transitions with the corresponding terminology in the AD Management Protocol.

AD Server Function of a Device

At least one AD Server must be operational in a Primary AD.

Primary AD device membership transitions are possible only when all active Primary AD Servers are present and operational in the local environment.

This rule prevents the domain creep threat—when the user repeatedly let devices join the AD then they go off to multiple different owners, who are subsequently able to illegally share content (although this is not a fast-growing WAN AD, but still something to be countered).

Once the AD Server functionality has been disabled in a device, it must never be able to be re-enabled again for the same PADI.

)m This rule is necessary to prevent the possibility of misuse by setting up multiple ADs with the same PADI, for the purpose of the undesired sharing of content.

Figure 3:
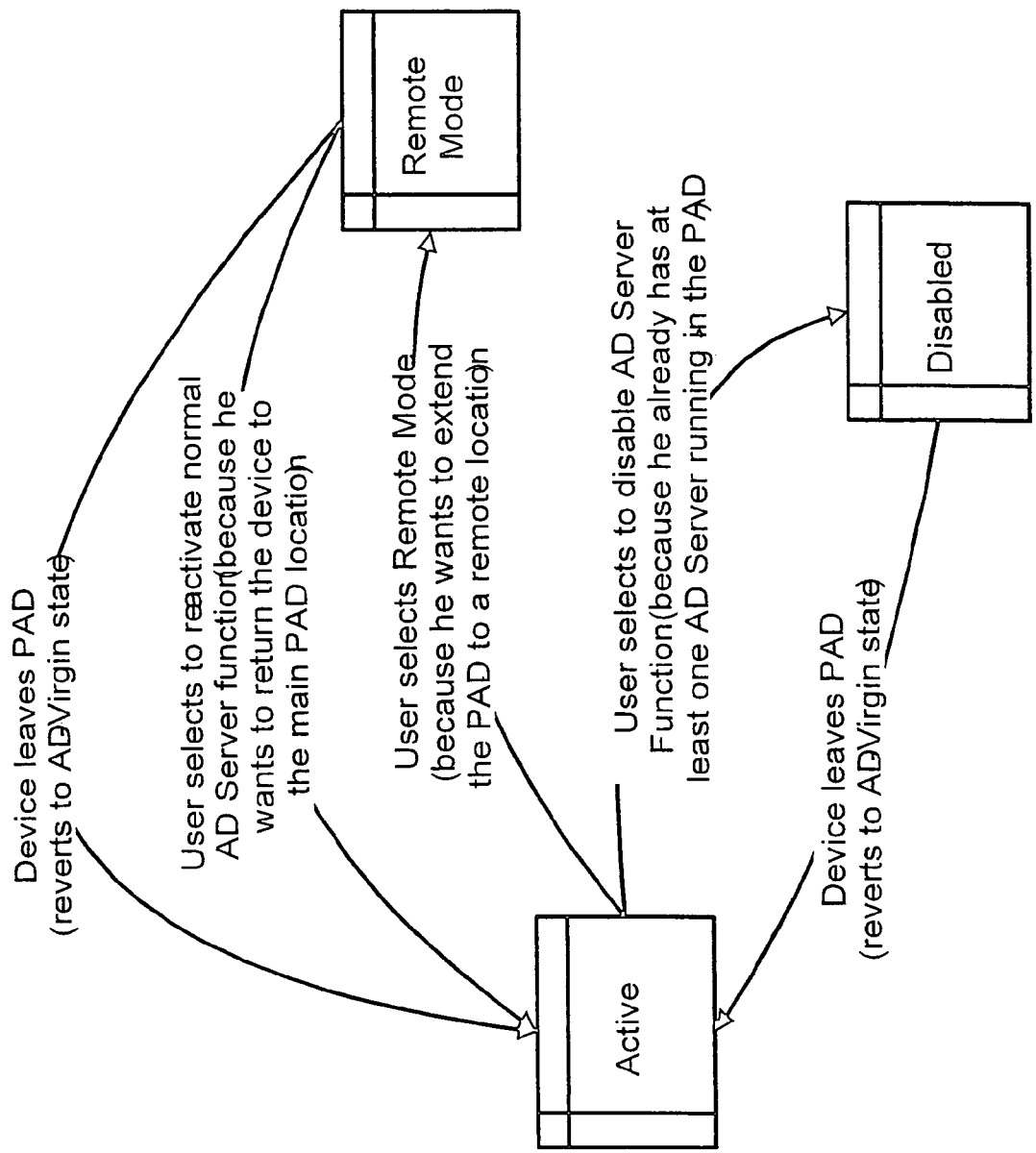
FIG. 3 is a schematical block diagram which shows some allowed actions and corresponding transitions with respect to the AD Server function in a device according to an embodiment of the present invention.

FIG. 3 shows the allowed actions and corresponding transitions with respect to the AD Server function in a device.

AD Management Scenarios

In this section, all conceivable user and device scenarios are treated, in order to show how the AD Management Compliance Rules, the AD Management and AD Server Protocols combine to provide the flexibility to cover various options of device capabilities and user interaction.

AD-virgin Device

A virgin device is a device in its ex-factory state, without any AD membership.

The PADI, SADI and MADI of a virgin device are set to some pre-defined reserved value that would be prohibited to be used as an ADI, for example zero, 0x00000000 in the preferred embodiment.

AD-virgin Device Forms an AD

If an AD-virgin device is operated alone, i.e. without being connected to an existing home network (AD), then the PADI and SADI can remain to be zero.

Of course, implementations are allowed which automatically ask the user if a new Primary AD should be initiated, or enable this operation to be selected from the user interface.

When a Virgin device needs to bind content to an AD, for example by storing broadcast TV content on its embedded hard-disk drive, then two implementations are allowed:

Content is allowed to be bound to the AD 0x00000000, the PADI of the virgin device, but that content is not allowed to be transferred outside of the embedded secure storage and is not accessible from outside. In order for such usage to occur, the user must first let the AD initiation process be carried out. Then any content bound to AD 0x00000000 inside the device will be re-bound to the new ADI. Reminder—the method of AD binding is out of the scope of the present method.

The user is asked to confirm that the device will operate in standalone mode. If so, the device will then initiate a new Primary AD, by assigning itself a random PADI, and bind or associate the content to that PADI.

Connect two AD-virgin Devices

When two devices in the AD-virgin state are connected together, the same rules apply as in the previous section. It is an implementation issue as to when the initiation of a new AD is performed, but it must be done before any content is exchanged between the two devices.

AD-virgin Device is Connected to an Existing AD

Only devices in the AD-Virgin state can permanently join another AD, i.e. can become members of a Primary AD, without performing an AD Merge (see section Two existing ADs merge).

Figure 4:
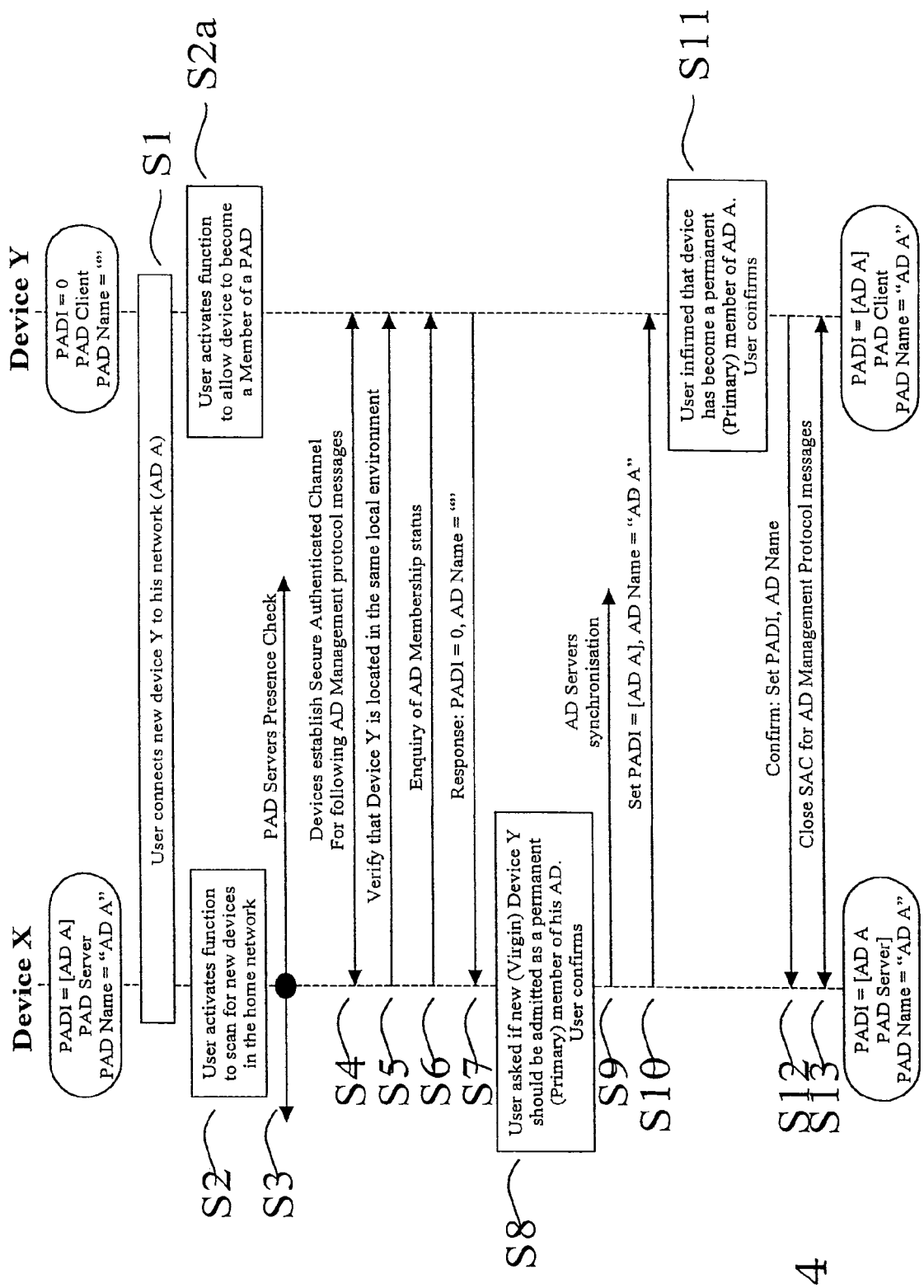
FIG. 4 is a flow chart which shows a possible sequence of events leading to the admission of a new AD-Virgin device to the PAD according to an embodiment of the present invention.

FIG. 4 shows the possible sequence of events leading to the admission of a new AD-Virgin device to the PAD.

Step S1 involves the normal connection of the new device to the user's home network, hosting the existing PAD, "AD A".

Step S2 is when the user explicitly requests the AD Server in device X to seek devices in the home network which would like to become members (Primary or Secondary) of the PAD, via user interface, pressing a dedicated physical button, or some other means.

After activation by the user of the scan function, the AD Server(s) recognize that a new compliant device has been connected and initiate the registration process for the new (AD Server or Client) device.

Step S2a is a similar action for the new device. Under certain circumstances this step may not be necessary. This could be the case for example if the device has only a wired network interface, so that an inadvertent join to a neighboring PAD via a wireless network connection could not occur.

Step S3 is the action by the AD Server, using the AD Server Protocol, to ensure that, if applicable, all other previously known AD Servers in the PAD are present and ready to register the new device.

Step S4 involves the setting up of a SAC between devices X and Y, the precise method of which is outside the scope of the present invention, in order to secure subsequent AD Management communications against manipulation.

Step S5 involves the verification that devices X and Y are operating in the same local environment. This is also outside the scope of the present invention, but it is a feature commonly required by home network technologies that carry protected content.

Step S6 is an application of the AD Management Protocol, to securely establish the current AD membership status of device Y.

Step S7 is the corresponding response from device Y, indicating its current AD membership status.

Step S8 is the implementation of the Compliance Rule maintaining that the user must be able to verify which device is being admitted to his PAD, and to be sure that device Y is being admitted to his PAD, and not a neighboring PAD which may by chance be reachable via a wireless connection, for example.

Step S9 is the deployment of the AD Server Protocol to update the other AD Server(s) about the AD Management status change. i.e. the increment of ADMC, or possibly about the explicit addition of new device Y to the PAD.

Step S10 deploys the AD Management Protocol to update the AD Membership status of device Y.

Step S11 is a further implementation of the Compliance Rule maintaining that the user must be able to verify which device is being admitted to his PAD, and to be sure that device Y is being admitted to his PAD, and not a neighboring PAD which may by chance be reachable via a wireless connection, for example. This step may be optional if device Y has no user interface, and inadvertent registrations to other PADs would not be possible.

Step S12 is the corresponding response from device Y, confirming the update to its AD membership status.

Step S13 involves the closing of the SAC set up in Step S4.

Once registered in the AD, the device can then be taken to a remote location but continue to share content with the main AD cluster (subject to remote access being allowed for that content—outside scope of the present invention). Remote locations in the AD can only contain AD Client devices, or AD Servers operating in Remote Mode, because the "all-AD-servers-present" rule would prevent new AD clients being admitted to the AD at the main location if one or more of the AD Servers are moved to a remote location.

This allows the inclusion of remotely installed equipment, e.g. in a summer cottage, to be included in the AD, so that content bound to the AD can be carried with the user on holiday for remote consumption.

Device Changes Ownership

The user must first remove the device's AD membership, effectively returning it to the AD-Virgin state, while the device is still connected to his AD. Thus the AD membership count is decremented and in the case that this device was an AD Server, the user is subsequently able to add other devices to his Primary AD.

Figure 5:
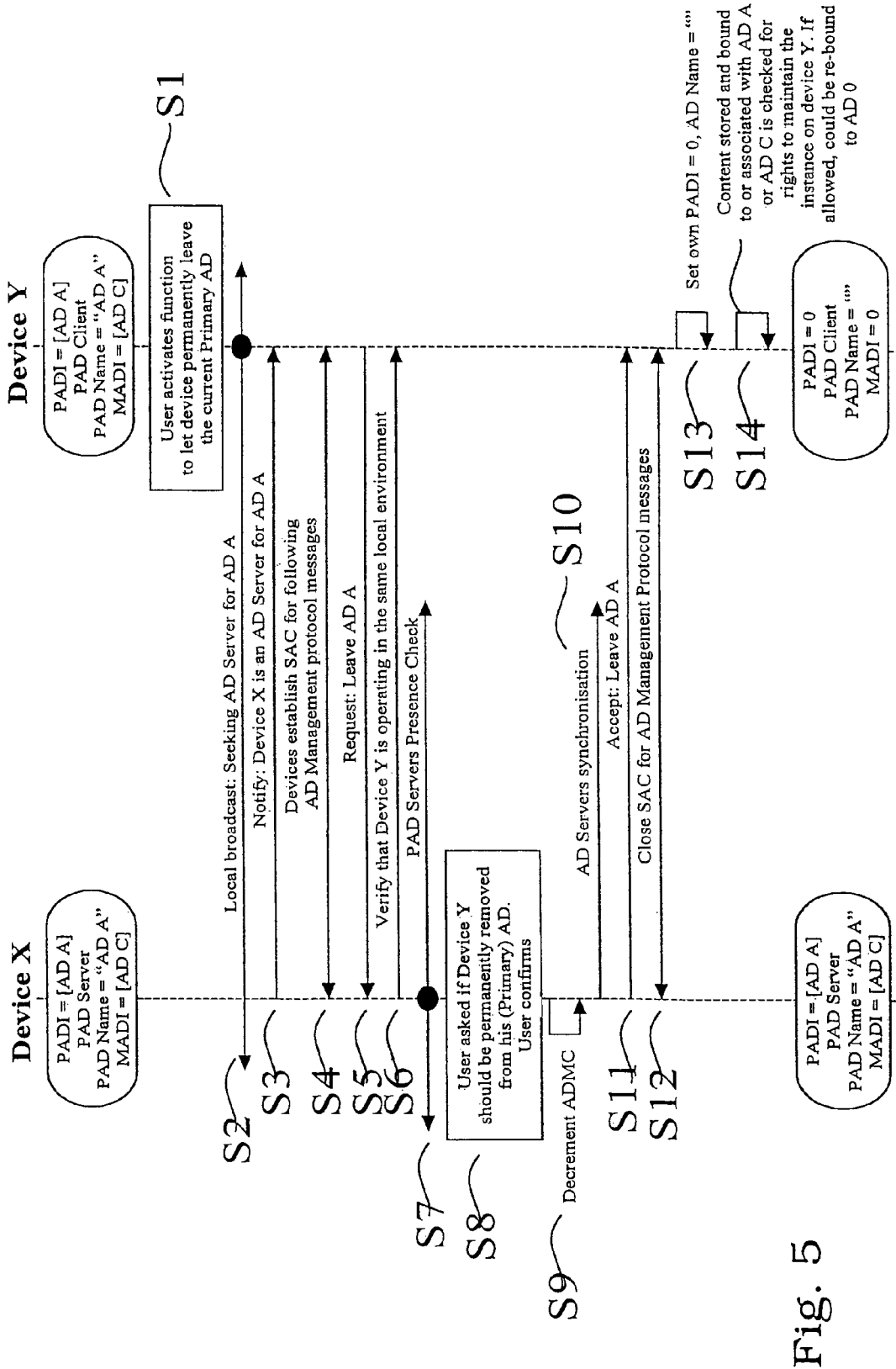
FIG. 5 is a flow chart which shows a possible sequence of events for the removal of a device from the PAD, when the removal, or leaving process is initiated by the Client device, for example after a specific user request via the device user interface according to an embodiment of the present invention.

FIG. 5 shows the possible sequence of events for the removal of a device from the PAD, when the removal, or leaving process is initiated by the Client device, for example after a specific user request via the device user interface.

Step S1 is when the user explicitly requests that device Y should leave its current Primary AD, in this case AD A, via the device user interface, for example.

In Step S2, device Y deploys the AD Management Protocol to initiate communications with the or an AD Server for its current PAD.

In Step S3, device X, being the or an AD Server for PAD A, responds to this local broadcast request.

Step S4 involves the setting up of a SAC between devices X and Y, the precise method of which is outside the scope of the present invention, in order to secure subsequent AD Management communications against manipulation.

Step S5 is an application of the AD Management Protocol, whereby device Y requests to device X, being the or an AD Server for the PAD, to leave the PAD.

Step S6 involves the verification that devices X and Y are operating in the same local environment. This is also outside the scope of the present invention, but it is a feature commonly required by home network technologies that carry protected content.

Step S7 is the action by the AD Server, using the AD Server Protocol, to ensure that, if applicable, all other previously known AD Servers in the PAD are present and ready to register the new device.

Step S8 is the implementation of the Compliance Rule maintaining that the user must be fully aware and be able to verify which device is going to be removed from his PAD.

Step S9 is internal to the AD Server actuating the AD Management change, in that ADMC is decremented.

Step S10 is the deployment of the AD Server Protocol to update the other AD Server(s) about the AD Management status change, i.e. the decrement of ADMC, or possibly about the explicit removal of device Y from the PAD.

Step S11 is the response to device Y, confirming the update to its AD membership status, i.e. that it has now left PAD A.

Step S12 involves the closing of the SAC set up in Step S4.

Step S13 is internal to device Y, where it actuates the secure settings of its AD Membership status.

Step S14 is where the overall CPCM system might also check for any content stored in the removed device. Depending on the USI of each content item, either C that item is allowed to be left on the removed device, but re-bound to the null PADI, or the instance is removed, for example if the master copy of the content item is stored on another device, and a first-generation copy is stored on the removed device, and the USI forbids copies to leave the AD.

Figure 6:
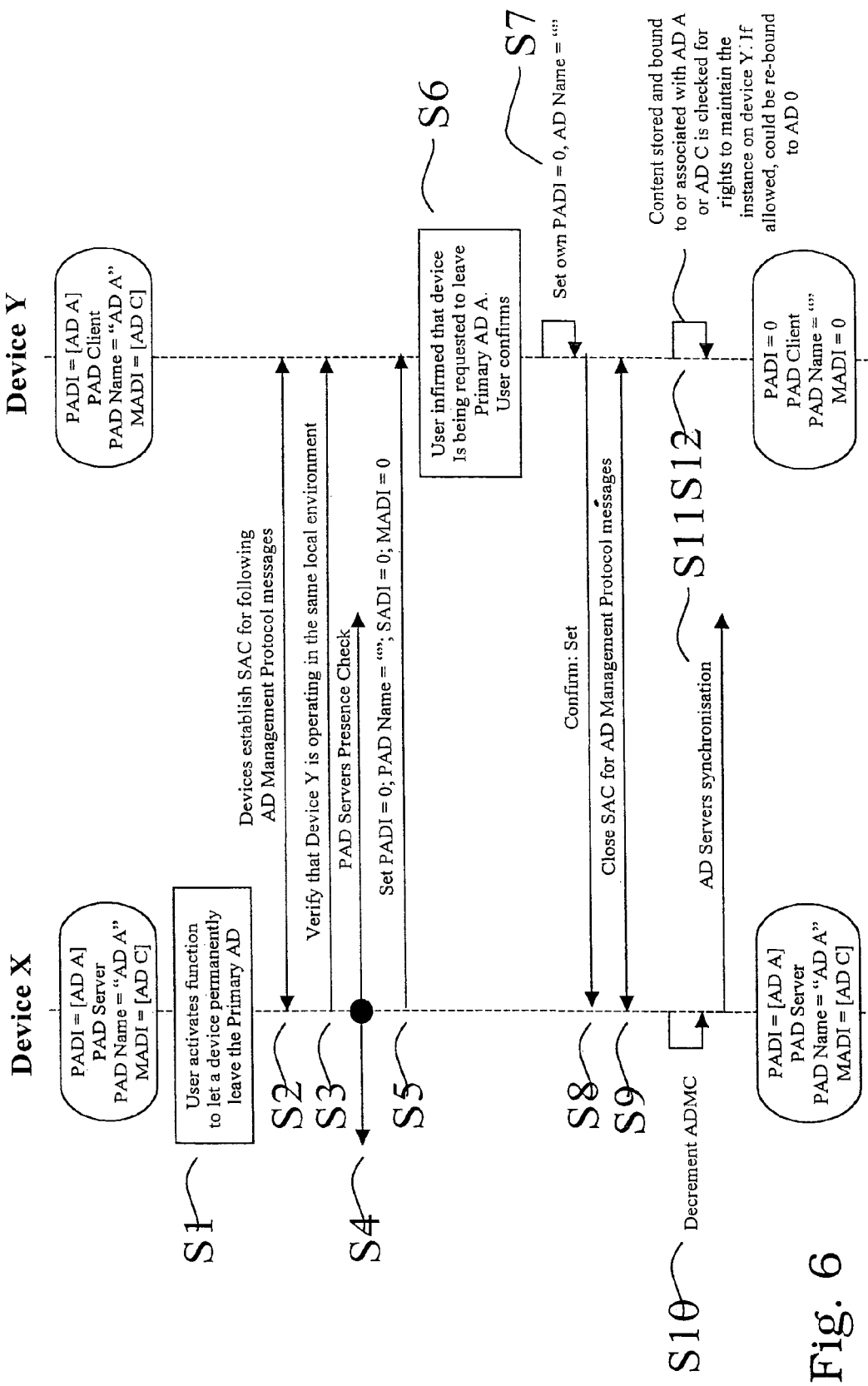
FIG. 6 is a flow chart which shows the possible sequence of events for the removal of a device from the PAD, when the removal, or leaving process is initiated by the AD Server device, for example after a specific user request via the device user interface according to an embodiment of the present invention.

FIG. 6 shows the possible sequence of events for the removal of a device from the PAD, when the removal, or leaving process is initiated by the AD Server device, for example after a specific user request via the device user interface.

Step S1 is when the user explicitly requests that device Y should leave its current Primary AD, in this case AD A, via the device user interface of device X, acting as PAD Server, for example.

Step S2 involves the setting up of a SAC between devices X and Y, the precise method of which is outside the scope of the present invention, in order to secure subsequent AD Management communications against manipulation.

Step S3 involves the verification that devices X and Y are operating In the same local environment. The method is outside the scope of the present invention, but it is a feature commonly required by home network technologies that carry protected content.

Step S4 is the action by the AD Server, using the AD Server Protocol, to ensure that, if applicable, all other previously known AD Servers in the PAD are present and ready to register the new device.

Step S5 is an application of the AD Management Protocol, whereby device X requests to device Y to set its AD Membership status to the AD-Virgin state.

Step S6 is an implementation of the Compliance Rule maintaining that the user must be able to verify that the device is going to leave his PAD. This step may be optional if device Y has no user interface.

Step S7 is internal to device Y, where it actuates the secure settings of its AD Membership status, assuming the user confirms such a change.

Step S8 is the response to device X, confirming the update to its AD membership status, i.e. that it has now left PAD A.

Step S9 involves the closing of the SAC set up in Step S4.

Step S10 is internal to the AD Server actuating the AD Management change, in that ADMC is decremented.

Step S11 is the deployment of the AD Server Protocol to update the other AD Server(s) about the AD Management status change, i. e. the decrement of ADMC, or possibly about the explicit removal of device Y from the PAD.

Step S12 is where the overall CPCM system might also check for any content stored in the removed device. Depending on the USI of each content item, either that item is allowed to be left on the removed device, but re-bound to the null PADI, or the instance is removed, for example if the master copy of the content item is stored on another device, and a first generation copy is stored on the removed device, and the USI forbids copies to leave the AD.

In the case of device Y changing owners, the new owner is now able to receive device Y and let it join his own PAD by the process described in the sub-section "AD-Virgin Device is connected to an existing AD".

If the device is to become a permanent member of another AD without a Merge, it must first be put into the AD-Virgin state, i. e. removing Primary, Secondary and Merged AD membership, by setting all these variables to 0. This is the scenario of selling on a device to another consumer. Note that the content bound to the original AD does not necessarily become accessible in the new AD.

The user might be informed by the device to be removed about any content which would be lost. The CPCM system would allow the secure movement of such content to a new storage location in the AD, so that the user retains access to that content.

Visiting Devices Temporarily Join a PAD

A friend, for example, brings a storage device carrying content bound to his AD, AD B, to view together with the household who owns AD A. The underlying CPCM system requires that no content transfer or copying is allowed to take place between the two ADs, when indicated in the respective content items USI. This is not contravened by the present invention. What is allowed is the temporary sharing of content, but only when the physical presence of both ADs devices are confirmed in the local environment. As already described under Compliance Rules, once the visiting device has been disconnected from the visited PAD, any content bound to the PAD of the visiting device will no longer be accessible to devices of the visited PAD, even if their Secondary AD Membership of the visiting PAD is maintained.

Figure 7:
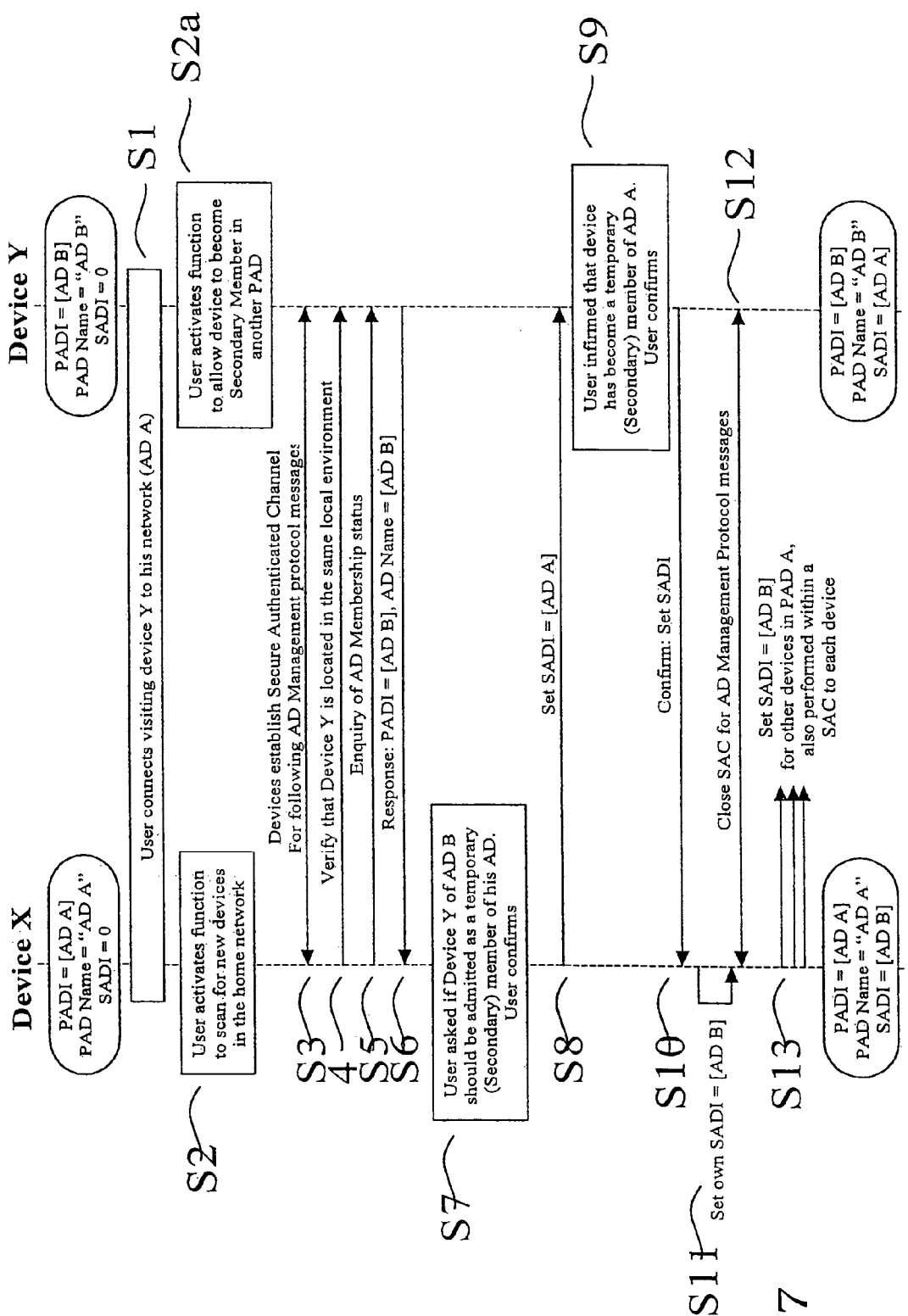
FIG. 7 is a flow chart which shows the sequence of events for the scenario of device Y becoming a Secondary Member of AD A, where device X is acting as AD Server according to an embodiment of the present invention.

FIG. 7 shows the sequence of events for the scenario of device Y becoming a Secondary Member of AD A, where device X is acting as AD Server.

Step S1 involves the normal connection of the new device to the user's home network, hosting the existing PAD, "AD A".

Step S2 is when the user explicitly requests the AD Server in device X to seek devices in the home network which would like to become members (Primary or Secondary) of the PAD, via user interface, pressing a dedicated physical button, or some other means.

Step S2a is a similar action for the visiting device. Under certain circumstances this step may not be necessary. This could be the case for example if the device has only a wired network interface, so that an inadvertent join to a neighboring PAD via a wireless network connection could not occur.

Step S3 involves the setting up of a SAC between devices X and Y, the precise method of which is outside the scope of the present invention, in order to secure subsequent AD Management communications against manipulation.

Step S4 involves the verification that devices X and Y are operating in the same local environment. This is also outside the scope of the present invention, but it is a feature commonly required by home network technologies that carry protected content.

Step S5 is an application of the AD Management Protocol, to securely establish the current AD membership status of device Y.

Step S6 is the corresponding response from device Y, indicating its current AD membership status.

Step S7 is the implementation of the Compliance Rule maintaining that the user must be able to verify which device is being admitted to his PAD as a Secondary Member, and to be sure that device Y is being admitted to his AD, and not a neighboring AD which may by chance be reachable via a wireless connection, for example.

Step S8 deploys the AD Management Protocol to update the AD Membership status of device Y, i. e. setting SADI.

Step S9 is a further implementation of the Compliance Rule maintaining that the user must be able to verify which device is being admitted to his AD, and to be sure that device Y is being admitted to his AD as a Secondary Member, and not a neighboring AD which may by chance be reachable via a wireless connection, for example.

If the temporary join is confirmed then both devices can access each other's content, also any content bound to each devices Merged AD, but no re-binding between domains is possible. If the temporary join is not confirmed, then according to the underlying CPCM system (out of the scope of the present invention), devices belonging to different PADs will not be able to access content bound to the other PAD.

Step S9 may be optional if device Y has no user interface, and inadvertent registrations to other PADs would not be possible.

Step S10 is the corresponding response from device Y, confirming the update to its AD membership status.

Step S11 is internal to device X, where it actuates the secure settings of its AD Membership status, assuming the user confirms such a change, i. e. set its SADI.

Step S12 involves the closing of the SAC set up in Step S4.

Step S13 deploys the AD Management Protocol to update the AD Membership status of other PAD member devices about the Secondary Membership in AD B, i.e. setting SADI. This could be done in general, or only explicitly when content is temporarily shared between the visited and visiting PADs.

As an extended everyday example, another friend might bring his high-quality projector to view the content. His device is a Primary Member of AD C. It turns out to be convenient to connect the visiting devices to the network constituting AD A, rather than just both devices together in a separate network. Thus devices from 3 different PADs are connected in the local environment. It would be left to each device's application and user interface to enable the temporary sharing of content, within the Compliance Rules already detailed, according to the ADI of the item of content to be shared.

Two Existing ADs Merge

The merging of two distinct PADs is also commonly known as the "marriage scenario"—where two previously separate households combine to form one single household. The problem with this scenario is that the previously separate PADs will have bound content to each PAD, but in the new combined PAD the users now reasonably expect to be able to access both sets of content in the new combined home network. The present invention enables this scenario by using the Merged AD field in the AD Management settings of a compliant device.

Each device from the second AD is introduced to the AD to be joined as a temporary member in the normal way described previously. As a secondary member, the user can select to initiate the permanent merging of the device to the new Primary AD. The merged device takes on the PADI of the AD that it has joined, and all devices in the PAD set their MADI to the original PAD of the devices joining the PAD.

Figure 8:
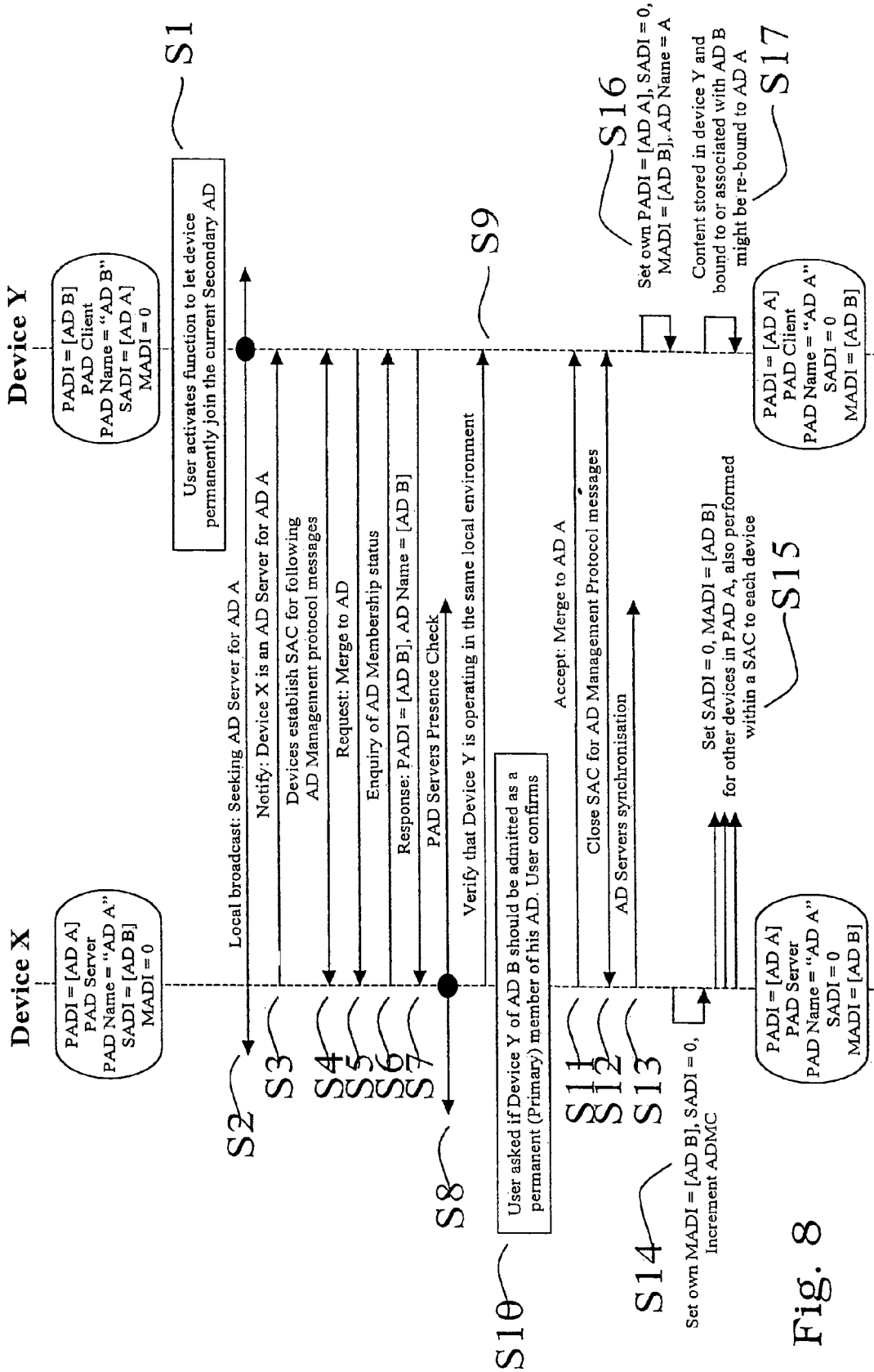
FIG. 8 is a flow chart which shows a sequence diagram of events for the process of merging one compliant device to a new primary authorized domain according to an embodiment of the present invention.

FIG. 8 shows the sequence diagram for the process of merging one compliant device to a new PAD.

For a device to be merged to a new PAD, it must already have been admitted to that AD as a Secondary Member.

Step S1 is when the user explicitly requests the Merge of Device Y to the PAD of which it is currently a Secondary Member.

In Step S2, device Y deploys the AD Management Protocol to initiate communications with the, or an, AD Server for the PAD of which it is currently a Secondary Member.

In Step S3, device X, being the or an AD Server for PAD A, responds to this local broadcast request.

Step S4 involves the setting up of a SAC between devices X and Y, the precise method of which is outside the scope of the present invention, in order to secure subsequent AD Management communications against manipulation.

Step S5 is an application of the AD Management Protocol, whereby device Y explicitly requests to become merged to the PAD of device X.

Step S6 is an application of the AD Management Protocol, to securely establish the current AD membership status of device Y.

Step S7 is the corresponding response from device Y, indicating its current AD membership status.

Step S8 is the action by the AD Server, using the AD Server Protocol, to ensure that, if applicable, all other previously known AD Servers in the PAD are present and ready to register the new device.

Step S9 involves the verification that devices X and Y are operating in the same local environment. This is also outside the scope of the present invention, but it is a feature commonly required by home network technologies that carry protected content.

Step S10 is the implementation of the Compliance Rule maintaining that the user must be able to verify which device is being merged to his PAD, and to be sure that device Y is being merged to his PAD, and not a neighboring PAD which may by chance be reachable via a wireless connection, for example.

Step S11 is the response to device Y corresponding to the request that device Y sent in Step S5, confirming the device Merge operation.

Step S12 involves the closing of the SAC set up in Step S4.

Step S13 is the deployment of the AD Server Protocol to update the other AD Server(s) about the AD Management status change, i. e. the increment of ADMC, or possibly about the explicit merge of device Y to the PAD.

Step S14 is internal to device X, where it actuates the secure settings of its AD Membership status, assuming the user has confirmed the change, i. e. update its SADI and MADI.

Step S15 deploys the AD Management Protocol to update the AD Membership status of other PAD member devices about the new Merged AD setting and the removed Secondary Membership in AD B, i.e. setting SADI and MADI.

Step S16 is internal to device Y, where it actuates the secure settings of its AD Membership status after the confirmation received in Step S11, i. e. update its PADI, SADI and MADI.

Step S17 could be deployed in order to re-bind content previously acquired for AD B and stored on device Y, to the new PAD, if allowed by the usage rules. Thus some content items will not be transferred to the new AD. The user might be notified of this either in advance of the device PAD transfer process. Authorized content might have been accessible anyway due to the MADI setting. Only content previously acquired on removable non rewritable media can not be rebound to the new PAD. Here the MADI enables access to this content in the new PAD.

It could be argued that MADI enables the AD creep threat to a certain extent. While it cannot be argued against this completely, as such a Merge could be performed illicitly, the AD Management Compliance Rules and Protocol make such an illicit Merge quite inconvenient for the users. The maximum number of devices still applies for the Merged AD, also limiting this threat.

New instances of content or copies of existing content are always bound to the current PADI.

This corresponds to marriage—a one-off event. Only one AD can be merged to another. Can merge a new one, but the old merged AD is not available any more.

Split of AD

The splitting of two ADs is also commonly referred to as the "divorce scenario". According to the present invention, each device that is intended to leave the existing AD and be taken to form a new AD is first removed from the original AD. The first two devices to be removed from the AD must be returned to their virgin state (with regard to AD membership). When they are connected again, but separately from the original AD, a new PAD with a new pseudo-random ADI, virtually certainly different from the original ADI, will be formed. Further devices to be moved just go through the same process as changing ownership.

Alternatively, the first device to be removed is then requested explicitly by the user to initiate a new Primary AD.

If a device to be removed from the AD carries bound content, then this content may be re-bound or associated to the null PADI. In the same way as for the virgin device binding content to the null PADI, such content will not be available to other devices. A new PAD must be formed, causing the content to be re-bound to the new PAD.

Summary of Compliant Device User Functionality

Here the list of user-accessible AD management functions, preferably via GUI, are summarized.

User Operations:

Start scan for new device(s) to join AD

Let device initiate a Primary AD

Let device join the Primary AD of which it is currently a Secondary (temporary) member Let device leave the AD, equivalent to Return device to AD virgin state (for resale, give away etc.)

Registry of visible but not-to-be-joined ADs, for example to avoid repeated appearance of one's neighbors AD and its devices (if they happens to be visible via wireless LAN, for example) whenever a new device is joined.

AD Server device that has no direct user interface, for example something like a current broadband access router, or home gateway, would have the above user functions included in its configuration and maintenance utility accessed by a web browser inside the home local network.

Preferred Embodiment

Here it is shown how the present invention could be applied in a home network system based on Universal Plug and Play Version 1 (UPnP VI) [6] as a preferred embodiment.

UPnP does not include security tools for the protection of control messages between devices, so the underlying CPCM system should provide the security tools required for the embodiment of the AD Management and AD Server Protocols proposed in the present invention.

UPnP defines the function of a Control Point, which controls AV Media Server and AV Media Renderer devices in the network. A Control Point is generally hosted in a device which the user uses to control other devices in his network. The Control Point has knowledge of the AD membership status of its host device in a proprietary way, but it uses the preferred embodiment in UPnP to establish the AD membership status of other devices, and if necessary to alter their AD membership in a compliant fashion dictated by the compliance rules listed earlier.

UPnP defines a discovery mechanism for UPnP compliant devices in the home network, called the Simple Service Discovery Protocol (SSDP). For the purpose of implementing the present invention, new SSDP service types are defined in order that devices can announce their compliance with the CPCM system that includes the present invention. These service types correspond to the two protocols put forward in the invention, namely the AD Management Protocol, and the AD Server Protocol. In SSDP terminology these protocols are realized by compliant devices offering the service type called preferably the "AuthorisedDomainMembership" service, for both AD Servers and AD Clients, and the "AuthorisedDomainServer" service for AD-Server capable devices only.

According to the UPnP architecture, the AuthorisedDomainMembership service is preferably a service of the (UPnP) Root Device, and it contains several (UPnP) Actions which expose the required functionality. These are preferably:

GetAuthorisedDomainMembership—this returns the current values of PADI, SADI, MADI, AD Name. This call could be realized collectively or by defining individual calls for the enquiry of each variable. Individual calls would look like:

GetPADI (out ui4 PADI );

GetSADI (out ui4 SADI );

GetMADI (out ui4 MADI)

GetPADName (out string ADName);

SetAuthorisedDomainMembership—this instructs the device to update the values of PADI, SADI, MADI, and AD name to the given values when a legitimate change has taken place. This is realized preferably using separate a call for each setting, as SetPADI and SetMADI will only be available to AD Servers. The individual calls would look like:

SetPADI (in ui4 PADI);

SetSADI (in ui4 SADI );

SetMADI (in ui4 MADI);

SetPADName (in string ADName);

The AuthorisedDomainServer service is also preferably a service of the (UPnP) Root Device, and it contains preferably the following UPnP Actions:

MergeToPAD—Specific request to an AD Server for a device (which is already a Secondary Member of the AD) to merge to the Primary AD LeavePAD—Specific request to an AD Server for a device to leave the Primary AD The UPnP AV Architecture defines the functions of Media Server, Control Point, and Media Renderer. A UPnP device implementation can include one or more of these functions.

Compliant Devices which implement a UPnP A/V Media Server and which are able to acquire protected content from some protection system, DRM, or CA system must also implement the AD Server service.

Compliant devices which implement a Control Point should provide user access to the necessary AD Management functions for the devices under their control.

SSDP Discovery Request—search for the, or an AD Server in the given PAD.

SSDP Discovery Response—Specific response to the above request notifying of the presence and identification of an AD Server for the given PAD.

SSDP Presence Announcement—notification of device's Primary AD membership, or of Primary, Secondary and Merged AD membership, and whether it is acting as an AD Server.

A/V Media Server and A/V Media Renderer verify mutually that the content transfer is allowed to be carried out according to the rules laid down by the present invention. This means in practice that all devices exchanging the content possess AD membership (either Primary, Secondary, or Merged) corresponding to the AD with which the content is associated or bound. The method by which this is achieved is outside the scope of the present invention.

The present invention inter alia covers the following aspects:

Method for the Administration and Management of Personal Domains of Devices for the Purpose of Audio-Visual Content Protection and Copy Management in the Consumer Environment.

Primary, Secondary and Merged AD membership, to allow commonly expected and consumer-friendly content usage scenarios.

Compliant device securely stores and processes PADI, SADI and MADI.

Virgin state of a device, not bound to an AD, PADI set to reserved value of preferably 0x 00000000.

AD Server and AD Client classes of compliant devices.

AD Server is able to grant Primary AD membership to other compliant devices.

AD Server has three modes of operation—Active, Disabled and Remote.

AD Management Protocol

AD Server Protocol.

Remote registration or removal of devices to/from the PAD via a proxy (data or software program), where the proxy is stored on a portable device or on a physical storage medium, and the transfer of the proxy between the AD Servers and the carrying device or medium is via the local network, transfer to/from a physical storage medium, or via a near-field communication module embedded in the device or medium.

List of each compliance rule.

Device, software program, or service that manipulates AD membership data of devices directly, bypassing the normal device behavior, usage rules and scenarios Device, software program, or service to:

reinstate lost AD membership status due to device malfunction and/or synchronize AD Servers after a device malfunction.

The present invention in other words relates to a method for operating networks. Said networks or a part thereof forms and is referred to as a domain or authorized domain which is assigned to and/or which belongs to a household or entity. Each of said authorized domains is formed by one or a plurality of networks or sub-networks of devices. Each device is assigned to at least one type of authorized domain and to one type of authorized domain identifier. Each type of authorized domain identifier is descriptive and/or characteristic for said respective authorized domain and its type as well as for a membership of said respective device to said respective domain. An access to, the provision of, and/or the transmission of data with respect to audio/video content by each device is in each case ruled on the basis of the respective assigned and/or carried authorized domain identifiers.

REFERENCES

[1] ISO/IEC1318-11 IPMP on MPEG-2 Systems

[2] Background Article on DVB CPCM: http://www.dvb.org/documents/newsletters/DVB-SCENE-05.pdf

[3] DVB World Conference 2004, Dublin, Presentation on DVB CPCM

[4] xCP Cluster Protocol: http://www.almaden.ibm.com/software/ds/ContentAssurance/papers/xCP_DVB.pdf

[5] Protected Entertainment Rights Management (PERM): http://wvtw.ietf.org/internet-drafts/draft-gildred-perm-01.txt

[6] Intel UPnP website: http://www.intel.com/technology/UPnP/index.htm

[7] Digital Living Network Alliance: http://www.dlna.org/

| Abbreviations | |
|---|---|
| AD | Authorized Domain |
| ADI | AD Identifier |
| ADMC | AD Membership Count |
| CPCM | Content Protection and Copy Management |
| DRM | Digital Rights Management |
| DVB | Digital Video Broadcast |
| IP | Internet Protocol |
| LAN | Local Area Network |
| MAD | Merged AD |
| MADI | Merged ADI |
| PAD | Primary AD |
| PADI | Primary ADI |
| SAD | Secondary AD |
| SADI | Secondary ADI |
| UR | (Content) Usage Rule(s) |
| USI | Usage State Information |
| WAN | Wide Area Network |

| Reference Symbols | |
|---|---|
| AD | authorized domain |
| ADI | authorized domain identifier |
| AND | authorized domain name |
| D | domain |
| d | device |
| D1 | first domain |
| d1 | first device |
| D2 | second domain |
| d2 | second device |
| MAD | merged authorized domain |
| MADI | merged authorized domain identifier |
| N | network |
| n | sub-network |
| PAD | primary authorized domain |
| PADI | primary authorized domain identifier |
| SAD | secondary authorized domain |
| SADI | secondary authorized domain identifier |

The invention claimed is:

1. Method for operating networks of devices (d), in particular for audio-video content protection and copy management,
   wherein at least a part of said networks in each case forms and is referred to as a domain (D) in particular being assigned to or belonging to one household or entity,
   wherein each domain (D) is logically or physically formed by one or by a plurality of sub-networks (n) of devices (d),
   wherein each device (d) is assigned to at least one authorized domain (AD) of said domains (D) by:
   assigning or storing in each case at least one type of authorized domain identifier (ADI) to/by said respective device (d), wherein each type of authorized domain identifier (ADI) is descriptive or characteristic for said authorized domain (AD) and its type as well as for a membership of said respective device (d) to said respective domain (D),
   in a first device (d1) of a first authorized domain (D1), a primary authorized domain identifier (PADI) is set as one of said authorized domain identifiers (ADI) and used in the first device (d1) in order to identify the first authorized domain (D1) as a primary authorized domain (PAD) and the first device (d1) as a primary member thereof, in order to have access to protected content which is associated with or bound to said primary authorized domain (PAD),
   in the first device (d1), a secondary authorized domain identifier (SADI) is set as one of said authorized domain identifiers (ADI), the secondary authorized domain identifier (SADI) being set in accordance with a primary authorized domain identifier (PADI) of and received from a second device (d2) of a second authorized domain (D2) in order to identify the second authorized domain (D2) as a secondary authorized domain (SAD), in order to have temporary access to protected content which is associated with or bound to the second device (d2) as long as the second device (d2) is connected or merged to said first authorized domain (D1), and
   an access to, a provision of, or a transmission of data with respect to audio/video content by each device (d) is in each case ruled only on the basis of the respective assigned or stored authorized domain identifiers (ADI).

2. Method according to claim 1, wherein a merged authorized domain identifier (MADI) is set and used in a respective device (d) of another domain (D') in order to identify as a merged authorized domain (MAD), a first domain (D) of said network (N) or a combination of first domains (D) of said network (N) to which said respective device (d) having assigned or storing the respective merged authorized domain identifier (MADI) as a new merged member of said first domain (D), in order to have access to protected content which is associated with or bound to said merged authorized domain (MAD).

3. Method according to claim 1,
   wherein a primary authorized domain identifier (PADI) of a respective device (d) is changed if and only if the respective device (d) changes its membership to be a primary member of another primary authorized domain identifier (PAD) or to be a merged member of another primary authorized domain identifier (PAD).

4. Method according to claim 1, wherein a process of partly or completely merging to a first authorized domain (AD, D1) as a primary authorized domain (PAD) a second authorized domain (AD, D2) as a merged authorized domain (PAD) comprises a step of assigning or carrying the respective primary authorized domain identifier (PADI) of the first authorized domain (AD, D1) as a merged authorized domain identifier (MADI) of the merged devices (d) of the second authorized domain (AD, D2) or the part thereof to be merged.

5. Method according to claim 1,
   wherein a process of partly or completely merging to a first authorized domain (AD, D1) as a primary authorized domain (PAD) a second authorized domain (AD, D2) as a merged authorized domain (MAD) comprises a step of enabling access to the content associated with or bounded by the second authorized domain (AD, D2) or the merged devices (d2) thereof by the first authorized domain (AD, D2) or by the respective devices (d1) thereof.

6. Method according to claim 1, wherein for each second device (d2) of a second authorized domain (AD, D2) as a secondary authorized domain (SAD) with respect to a first authorized domain (AD, D1) as a primary authorized domain (PAD) a content associated with or bound to first devices (d1) of said first authorized domain (AD, D1) as said primary authorized domain (PAD) or to third devices (d2) of a third authorized domain (AD, D3) as a merged authorized domain (MAD) with respect to said first authorized domain (AD, D1) as said primary authorized domain (PAD) is made temporarily accessible.

7. Method according to claim 1, wherein content associated with or bound to a second device (d2) of a primary authorized domain (PAD), a secondary authorized domain (SAD), or a merged authorized domain (MAD) is made accessible to any first device (d1) connected to said primary authorized domain (PAD), secondary authorized domain (SAD), or merged authorized domain (MAD).

8. Method according to claim 1, wherein content which is newly created by a device of a primary authorized domain (PAD), secondary authorized domain (SAD), or merged authorized domain (MAD) is associated with or bound to the underlying primary authorized domain (PAD) and the respective primary authorized domain identifier (PADI).

9. Method according to claim 1,
   wherein devices (d) of the network (N) and in particular of the domains (D) of the network are classified as being either authorized domain servers or AD servers or as being authorized domain clients or AD clients and as having either server or client capabilities and functionalities.

10. Method according to claim 9,
    wherein each AD server is—in particular in an active mode—enabled to have one or an arbitrary plurality of capabilities/functionalities of the group of capabilities/functionalities which consists of:
    initiating new authorized domains (AD),
    granting the right of membership with respect to an underlying primary
    authorized domain (PAD), to a given other device (d) and
    managing the process of terminating a given membership of a given device (d) to an underlying primary authorized domain (PAD).

11. Method according to claim 9, wherein each device (d) which is capable of ingesting content into an underlying primary authorized domain (PAD) is enabled to have capabilities or functionalities of an AD server.

12. Method according to claim 9,
    wherein a plurality of AD servers is operated in one given primary authorized domain (PAD).

13. Method according to claim 9, wherein AD servers or AD clients are enabled to become secondary members of another primary authorized domain (PAD).

14. Method according to claim 1, wherein an authorized domain management protocol or AD management protocol is realized and used, which in particular consists of one or an arbitrary plurality of items of the group of items which consists of:
- local network broadcast notification of device's Primary AD membership, or of Primary, Secondary and Merged AD membership, and whether it is acting as an AD Server,
- specific enquiry to a device to ascertain its AD membership status (Primary, Secondary and Merged ADI's, AD Name, Server or Client for PAD),
- specific response to the above enquiry containing the requested information for the enquired device,
- local network broadcast enquiry of device's need to interact with the AD Server in the given PAD,
- specific response to the above enquiry notifying of the presence and identification of an AD Server for the given PADI,
- specific command to a device to set its Primary, Secondary, or Merged ADI, AD Name to the given value(s),
- specific response to the above command indicating whether the command could be carried out or not,
- specific request to an AD Server for a device (which is already a Secondary Member of the AD) to merge to the Primary AD,
- specific request to an AD Server for a device to leave the Primary AD,
- specific responses to each of the preceding three requests indicating whether the request could be carried out or not.

15. Method according to claim 1,
wherein a plurality of AD servers is employed in at least one primary authorized domain (PAD) and
wherein an authorized domain server protocol or AD server protocol is realized and used, which in particular consists of one or an arbitrary plurality of items of the group of items which consists of:
- specific enquiry to another AD Server to ascertain the AD Server status of the PAD,
- specific response to the above command providing a list of AD Server devices ID's and the current value of ADMC,
- specific request to another AD Server to increment ADMC, decrement ADMC, or set ADMC to the given value,
- specific notification to another AD Server that the device will disable its AD Server function, thus is to be removed from the list of Primary AD Servers.

16. Method according to claim 1, wherein protected content is bound to or associated with a given particular primary authorized domain (PAD) or to the respective member devices (d) thereof,
wherein in particular the respective content protection is defined by a respective usage state information (USI).

17. Method according to claim 1, wherein all member devices (d) of a given primary authorized domain (PAD) are allowed or are enabled to have access to content within the bounds of the content's usage state information (USI).

18. Method according to claim 1, wherein temporary or secondary member devices (d) of a given primary authorized domain (PAD) are allowed or are enabled to have access to content associated with or bound to said given primary authorized domain (PAD) or to a given merged authorized domain (MAD) if and only if said temporary or secondary member devices (d) are physically located in the same local environment as said given primary authorized domain (PAD).

19. Method according to claim 1, wherein primary member devices (d) of a given authorized domain (AD) are allowed or are enabled to have access to content bound to the Secondary Member's PAD only when the device carrying such content is physically located in the same local environment as said primary authorized domain (PAD).

20. Method according to claim 1, wherein continued presence of primary or secondary members devices (d) is verified prior each process of content exchange, in particular in all cases where the respective content item is bound to the respective secondary authorized domain (SAD) or to the respective secondary authorized domain identifier (SADI).

21. Method according to claim 1,
wherein there is defined a finite maximum number of devices—being it AD servers or AD clients—that can be member devices of one primary authorized domain (PAD).

22. Method according to claim 1, wherein a compliant device (d) is enabled to become a member device—whether primary or secondary—of an authorized domain (AD) only after the registration procedure or process has been started or carried out, in particular explicitly initiated by a user or in particular only upon the specific affirmative action of the user.

23. Method according to claim 1,
wherein primary authorized domain device membership transitions are enabled or made possible if and only if the physical vicinity to the AD Server(s) can be verified, in particular if the respective device is connected to the network (N) or sub-network (n), in particular to a LAN.

24. Method according to claim 1,
wherein only an AD virgin devices can directly join an existing primary authorized domain (PAD).

25. Method according to claim 1, wherein
a storage medium is used in order to prepare an AD virgin device (d) to be used in a method according to claim 1 and in particular in order to become a primary member of a given primary authorized domain (PAD).

26. Method according to claim 25,
wherein a respective primary authorized domain identifier (PADI) is transferred to said respective AD virgin device (d) by using said storage medium.

27. Method according to claim 25, wherein
said storage medium is prepared—in particular within a given primary authorized domain (PAD)—in order to carry a respective primary authorized domain identifier (PADI) of an or of said given primary authorized domain (PAD),
wherein said storage medium is transferred to said AD virgin device (d) in particular by removing it from said given primary authorized domain (PAD), and
wherein said storage medium is read by said AD virgin device in order to carry said respective primary authorized domain identifier (PADI) of said given primary authorized domain (PAD) and in order to become a primary member of said given primary authorized domain (PAD).

28. Method according to claim 1,
wherein an AD virgin device can establish a new primary authorized domain (PAD).

29. Method according to claim 1,
wherein a device (d) which is a primary member of one primary authorized domain (PAD) can only become a secondary member of another and different primary authorized domain (PAD).

30. Method according to claim 1,
wherein only a device which is a secondary member of a primary authorized domain (PAD) can become merged to said primary authorized domain (PAD).

31. Method according to claim 1,
wherein a device which leaves a primary authorized domain (PAD) is effectively put into the AD virgin state.

32. Method according to claim 1,
wherein at least one AD server is provided and operational in a primary authorized domain (PAD).

33. Method according to claim 1, wherein primary AD device membership transitions are enabled or are made possible if only if all active primary AD servers are present and operational in the local environment.

34. Method according to claim 1,
wherein once an AD server functionality has been disabled in a device (d) it is never enabled again to be re-enabled for the same primary authorized domain (PAD) or the same primary authorized domain identifier (PADI).

35. System or apparatus for audio-video content protection and copy management, comprising:
means for forming at least a part of networks as a domain (D) in particular being assigned to or belonging to one household or entity, each domain (D) being logically or physically formed by one or by a plurality of sub-networks (n) of devices (d);
means for assigning each device (d) to at least one authorized domain (AD) of said domains (D) by assigning or storing in each case at least one type of authorized domain identifier (ADI) to/by said respective device (d), wherein each type of authorized domain identifier (ADI) is descriptive or characteristic for said authorized domain (AD) and its type as well as for a membership of said respective device (d) to said respective domain (D);
means for controlling an access to, a provision of, or a transmission of data with respect to audio/video content by each device (d) is in each case ruled only on the basis of the respective assigned or stored authorized domain identifiers (ADI);
means for obtaining or generating a primary authorized domain identifier (PADI) for a respective primary authorize domain (PAD);
means for storing a primary authorized domain identifier (PADI) for a respective primary authorized domain (PAD) within the respective primary authorized domain (PAD);
means for obtaining an authorized domain identifier (ADI), including a primary authorized domain identifier (PADI), a secondary authorized domain identifier (SADI) or a merged authorized domain identifier (MADI) from and for a respective authorized domain device (d); and
means for comparing said primary authorized domain identifier (PADI) for said respective primary authorized domain (PAD) with said authorized domain identifier (ADI) of said device, wherein
in a first device (d1) of a first authorized domain (D1), a primary authorized domain identifier (PADI) is set as one of said authorized domain identifiers (ADI) and used in the first device (d1) in order to identify the first authorized domain (D1) as a primary authorized domain (PAD) and the first device (d1) as a primary member thereof, in order to have access to protected content which is associated with or bound to said primary authorized domain (PAD), and
in the first device (d1), a secondary authorized domain identifier (SADI) is set as one of said authorized domain identifiers (ADI), the secondary authorized domain identifier (SADI) being set in accordance with a primary authorized domain identifier (PADI) of and received from a second device (d2) of a second authorized domain (D2) in order to identify the second authorized domain (D2) as a secondary authorized domain (SAD), in order to have temporary access to protected content which is associated with or bound to the second device (d2) as long as the second device (d2) is connected or merged to said first authorized domain (D1).

36. Device for a network which is adapted and arranged for a process of operating networks of devices (d), in particular for audio-video content protection and copy management, comprising:
means for forming at least a part of networks as a domain (D) in particular being assigned to or belonging to one household or entity, each domain (D) being logically or physically formed by one or by a plurality of sub-networks (n) of devices (d);
means for assigning each device (d) to at least one authorized domain (AD) of said domains (D) by assigning or storing in each case at least one type of authorized domain identifier (ADI) to/by said respective device (d), wherein each type of authorized domain identifier (ADI) is descriptive or characteristic for said authorized domain (AD) and its type as well as for a membership of said respective device (d) to said respective domain (D);
means for controlling an access to, a provision of, or a transmission of data with respect to audio/video content by each device (d) is in each case ruled only on the basis of the respective assigned or stored authorized domain identifiers (ADI);
means for obtaining or generating at least one authorized domain identifier (ADI, in particular a primary authorized domain identifier (PADI), a secondary authorized domain identifier (SADI), or a merged authorized domain identifier (MADI) with respect to a given authorized domain (AD), and
at least one means for storing said at least one authorized domain identifier (ADI), including said primary authorized domain identifier (PADI), said secondary authorized domain identifier (SADI), or said merged authorized domain identifier (MADI), wherein
in a first device (d1) of a first authorized domain (D1), a primary authorized domain identifier (PADI) is set as one of said authorized domain identifiers (ADI) and used in the first device (d1) in order to identify the first authorized domain (D1) as a primary authorized domain (PAD) and the first device (d1) as a primary member thereof, in order to have access to protected content which is associated with or bound to said primary authorized domain (PAD), and
in the first device (d1), a secondary authorized domain identifier (SADI) is set as one of said authorized domain identifiers (ADI), the secondary authorized domain identifier (SADI) being set in accordance with a primary authorized domain identifier (PADI) of and received from a second device (d2) of a second authorized domain (D2) in order to identify the second authorized domain (D2) as a secondary authorized domain (SAD), in order to have temporary access to protected content which is associated with or bound to the second device (d2) as long as the second device (d2) is connected or merged to said first authorized domain (D1).

37. A non-transitory computer readable storage medium comprising a computer program product, the computer program product comprising computer means which is adapted to realize the method for operating networks of devices according to claim 1 when it is executed on a computer or a digital signal processing means.

38. A non-transitory storage medium which is configured to enable an AD virgin device (d) in order to be used in a method according to claim 1 and in particular in order to become a primary member of a given primary authorized domain (PAD).

39. Storage medium according to claim 38,
which carries or has stored a respective primary authorized domain identifier (PADI) of a respective primary authorized domain (PAD) and
which is adapted and arranged in order to be read by an AD virgin device (d).

* * * * *